(12) United States Patent
Bernstein et al.

(10) Patent No.: US 12,001,203 B2
(45) Date of Patent: *Jun. 4, 2024

(54) SELF PROPELLED DEVICE WITH MAGNETIC COUPLING

(71) Applicant: Sphero, Inc., Boulder, CO (US)

(72) Inventors: Ian H. Bernstein, Boulder, CO (US); Adam Wilson, Longmont, CO (US); Chun Kong, Hong Kong (HK); Ross MacGregor, Erie, CO (US)

(73) Assignee: Sphero, Inc., Boulder, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/671,008

(22) Filed: Feb. 14, 2022

(65) Prior Publication Data

US 2022/0244723 A1    Aug. 4, 2022

Related U.S. Application Data

(63) Continuation of application No. 16/578,822, filed on Sep. 23, 2019, now Pat. No. 11,249,472, which is a continuation of application No. 15/888,354, filed on Feb. 5, 2018, now Pat. No. 10,423,155, which is a continuation of application No. 15/232,490, filed on Aug. 9, 2016, now Pat. No. 9,886,032, which is a
(Continued)

(51) Int. Cl.
| | |
|---|---|
| *A63H 33/26* | (2006.01) |
| *A63H 30/04* | (2006.01) |
| *A63H 33/00* | (2006.01) |
| *B60R 11/00* | (2006.01) |
| *B62D 39/00* | (2006.01) |
| *B62D 61/00* | (2006.01) |
| *G05D 1/00* | (2006.01) |

(52) U.S. Cl.
CPC .......... *G05D 1/0022* (2013.01); *A63H 30/04* (2013.01); *A63H 33/005* (2013.01); *A63H 33/26* (2013.01); *B60R 11/00* (2013.01); *B62D 39/00* (2013.01); *B62D 61/00* (2013.01); *G05D 1/0016* (2013.01); *G05D 1/027* (2013.01); *B60R 2011/007* (2013.01); *Y10S 901/01* (2013.01)

(58) Field of Classification Search
CPC ...... A63H 33/26; A63H 33/005; B60R 11/00; B60R 2011/007; B62D 39/00; B62D 61/00; G05D 1/0016; G05D 1/027; G05D 2201/0214; G05D 1/0022; Y10S 901/01
USPC .......................................................... 180/167
See application file for complete search history.

(56) References Cited

U.S. PATENT DOCUMENTS

| 90,546 A | 5/1869 | Huntington |
|---|---|---|
| 933,623 A | 9/1909 | Cecil |

(Continued)

OTHER PUBLICATIONS

US 9,342,073 B2, 05/2016, Berstein et al. (withdrawn)
(Continued)

*Primary Examiner* — James A Shriver, II
*Assistant Examiner* — Hilary L Johns

(57) ABSTRACT

A self-propelled device includes a spherical housing and an internal drive system. The self-propelled device can further include an internal structure having a magnet holder that holds a first set of magnets and an external accessory comprising a second set of magnets to magnetically interact, through the spherical housing, with the first set magnets.

19 Claims, 13 Drawing Sheets

Related U.S. Application Data continuation of application No. 14/975,510, filed on Dec. 18, 2015, now Pat. No. 9,457,730, which is a continuation of application No. 14/691,349, filed on Apr. 20, 2015, now Pat. No. 9,429,940, which is a continuation-in-part of application No. 14/459,235, filed on Aug. 13, 2014, now Pat. No. 9,090,214, which is a continuation-in-part of application No. 14/035,841, filed on Sep. 24, 2013, now Pat. No. 9,193,404, which is a continuation of application No. 13/342,853, filed on Jan. 3, 2012, now Pat. No. 8,571,781.

(60) Provisional application No. 62/149,441, filed on Apr. 17, 2015, provisional application No. 61/553,923, filed on Oct. 31, 2011, provisional application No. 61/430,023, filed on Jan. 5, 2011, provisional application No. 61/430,083, filed on Jan. 5, 2011.

(56) References Cited

U.S. PATENT DOCUMENTS

| | | | | |
|---|---|---|---|---|
| 1,263,262 | A | 4/1918 | McFaul | |
| 2,796,601 | A | 11/1956 | Hagopian | |
| 2,949,696 | A | 8/1960 | Easterling | |
| 2,977,714 | A | 4/1961 | Gibson | |
| 3,313,365 | A | 4/1967 | Jackson | |
| 3,667,156 | A | 6/1972 | Tomiyama | |
| 3,683,216 | A | 8/1972 | Post | |
| 3,821,995 | A | 7/1974 | Aghnides | |
| 4,310,987 | A | 1/1982 | Chieffo | |
| 4,519,466 | A | 5/1985 | Shiraishi | |
| 4,541,814 | A | 9/1985 | Martin | |
| 4,601,675 | A | 7/1986 | Robinson | |
| 4,733,737 | A | 3/1988 | Falamak | |
| 4,893,182 | A | 1/1990 | Gautraud | |
| 4,897,070 | A | 1/1990 | Wagstaff | |
| 4,996,468 | A | 2/1991 | Field et al. | |
| 5,087,000 | A | 2/1992 | Suto | |
| 5,213,176 | A * | 5/1993 | Oroku | G05D 1/0272 180/7.1 |
| 5,297,981 | A | 3/1994 | Maxim et al. | |
| 5,342,051 | A | 8/1994 | Rankin et al. | |
| 5,413,345 | A | 5/1995 | Nauck | |
| 5,439,408 | A | 8/1995 | Wilkinson | |
| 5,489,099 | A | 2/1996 | Rankin et al. | |
| 5,513,854 | A | 3/1996 | Daver | |
| 5,595,121 | A | 1/1997 | Elliot | |
| 5,628,232 | A | 5/1997 | Bakholdin et al. | |
| 5,644,139 | A | 7/1997 | Allen et al. | |
| 5,676,582 | A | 10/1997 | Lin | |
| 5,739,657 | A | 4/1998 | Takayama et al. | |
| 5,759,083 | A | 6/1998 | Polumbaum et al. | |
| 5,780,826 | A | 7/1998 | Hareyama et al. | |
| 5,793,142 | A | 9/1998 | Richard | |
| 5,871,386 | A | 2/1999 | Bart et al. | |
| 5,952,796 | A | 9/1999 | Colgate et al. | |
| 5,953,056 | A | 9/1999 | Tucker | |
| 6,017,272 | A | 1/2000 | Rieder | |
| 6,021,222 | A | 2/2000 | Yamagata | |
| 6,144,128 | A | 11/2000 | Rosen | |
| 6,227,933 | B1 | 5/2001 | Michaud et al. | |
| 6,246,927 | B1 | 6/2001 | Dratman | |
| 6,267,673 | B1 | 7/2001 | Miyamoto | |
| 6,315,667 | B1 | 11/2001 | Steinhart | |
| 6,320,352 | B2 | 11/2001 | Terazoe | |
| 6,390,213 | B1 | 5/2002 | Bleicher | |
| 6,439,956 | B1 | 7/2002 | Ho | |
| 6,430,471 | B1 | 8/2002 | Kintou | |
| 6,449,010 | B1 | 9/2002 | Tucker | |
| 6,456,938 | B1 | 9/2002 | Bernard | |
| 6,458,008 | B1 * | 10/2002 | Hyneman | A63H 1/00 446/259 |
| 6,459,955 | B1 * | 10/2002 | Bartsch | G05D 1/0274 318/587 |
| 6,502,657 | B2 | 1/2003 | Kerrebrock et al. | |
| 6,535,793 | B2 | 3/2003 | Allard | |
| 6,573,883 | B1 | 6/2003 | Bertlett | |
| 6,584,376 | B1 | 6/2003 | Van Kommer | |
| 6,604,181 | B1 | 8/2003 | Moriya | |
| 6,615,109 | B1 | 9/2003 | Matsuoka et al. | |
| 6,764,373 | B1 | 7/2004 | Osawa et al. | |
| 6,785,590 | B2 | 8/2004 | Kasuga | |
| 6,786,795 | B1 | 9/2004 | Mullaney et al. | |
| 6,789,768 | B1 | 9/2004 | Kalisch | |
| 6,856,696 | B1 | 2/2005 | Ajioka | |
| 6,859,555 | B1 | 2/2005 | Fang | |
| 6,901,110 | B1 | 5/2005 | Tsougarakis et al. | |
| 6,902,464 | B1 | 6/2005 | Lee | |
| 6,945,843 | B1 | 9/2005 | Motosko | |
| 6,965,206 | B2 * | 11/2005 | Kamen | B62D 57/00 388/903 |
| 6,980,956 | B1 | 12/2005 | Takagi et al. | |
| 7,058,205 | B2 | 6/2006 | Jepson et al. | |
| 7,069,113 | B2 | 6/2006 | Matsuoka et al. | |
| 7,130,741 | B2 | 10/2006 | Bodin et al. | |
| 7,170,047 | B2 | 1/2007 | Pal | |
| 7,173,604 | B2 | 2/2007 | Marvit et al. | |
| 7,258,591 | B2 * | 8/2007 | Xu | A63H 33/26 446/379 |
| 7,283,647 | B2 | 10/2007 | McNitt | |
| 7,292,711 | B2 | 11/2007 | Kiraly et al. | |
| 7,298,869 | B1 | 11/2007 | Abernathy | |
| 7,324,663 | B2 | 1/2008 | Kiraly et al. | |
| 7,328,671 | B2 | 2/2008 | Kates | |
| 7,340,077 | B2 * | 3/2008 | Gokturk | G06F 3/017 348/208.14 |
| 7,340,344 | B2 | 3/2008 | Chappell | |
| 7,344,430 | B2 | 3/2008 | Hasty et al. | |
| 7,409,924 | B2 | 8/2008 | Kates | |
| 7,424,867 | B2 | 9/2008 | Kates | |
| 7,432,718 | B2 * | 10/2008 | Ishihara | H04R 5/02 700/245 |
| 7,463,001 | B2 | 12/2008 | Tsurukawa | |
| 7,483,049 | B2 | 1/2009 | Aman | |
| 7,499,077 | B2 | 3/2009 | Li | |
| 7,501,780 | B2 | 3/2009 | Yamamoto | |
| 7,526,362 | B2 * | 4/2009 | Kim | G05D 1/0033 701/28 |
| 7,538,764 | B2 | 5/2009 | Salomie | |
| 7,542,597 | B2 | 6/2009 | Rahn et al. | |
| 7,639,874 | B2 | 12/2009 | Bushell et al. | |
| 7,699,683 | B2 | 4/2010 | Caspi | |
| 7,702,131 | B2 | 4/2010 | Chinen et al. | |
| 7,714,880 | B2 | 5/2010 | Johnson | |
| 7,714,895 | B2 | 5/2010 | Pretlove et al. | |
| 7,726,422 | B2 * | 6/2010 | Sun | B62D 57/00 180/21 |
| 7,729,537 | B2 | 6/2010 | Grady | |
| 7,755,660 | B2 | 7/2010 | Nejikovsky et al. | |
| 7,773,773 | B2 | 8/2010 | Abercrombie | |
| 7,822,507 | B2 * | 10/2010 | Ishihara | G06F 3/0346 700/245 |
| 7,847,504 | B2 * | 12/2010 | Hollis | G05D 1/0891 318/568.11 |
| 7,853,357 | B2 * | 12/2010 | Sawada | B25J 13/00 706/14 |
| 7,889,226 | B2 | 2/2011 | Pescatore et al. | |
| 7,957,837 | B2 * | 6/2011 | Ziegler | G05D 1/0246 901/1 |
| 7,979,162 | B2 * | 7/2011 | Niemela | B25J 9/1612 414/730 |
| 8,025,551 | B2 * | 9/2011 | Torres | A63H 33/003 446/431 |
| 8,038,504 | B1 * | 10/2011 | Wong | A63H 30/04 446/454 |
| 8,077,914 | B1 | 12/2011 | Kaplan | |
| 8,077,981 | B2 | 12/2011 | Elangovan et al. | |
| 8,099,189 | B2 * | 1/2012 | Kaznov | A63H 17/00 700/47 |

(56) References Cited

U.S. PATENT DOCUMENTS

| | | | |
|---|---|---|---|
| 8,128,450 B2 * | 3/2012 | Imai | A63H 33/003 446/470 |
| 8,128,500 B1 * | 3/2012 | Borst | A63F 13/335 446/268 |
| 8,142,287 B2 * | 3/2012 | Podoloff | A63F 13/06 446/454 |
| 8,144,118 B2 | 3/2012 | Hildreith | |
| 8,180,436 B2 * | 5/2012 | Boyden | A61N 5/0624 600/476 |
| 8,190,295 B1 | 5/2012 | Garretson | |
| 8,195,333 B2 | 6/2012 | Ziegler et al. | |
| 8,197,298 B2 * | 6/2012 | Willett | A63H 33/003 446/470 |
| 8,210,289 B1 | 7/2012 | Lu et al. | |
| 8,258,917 B2 * | 9/2012 | Cai | G06F 3/0346 700/247 |
| 8,269,447 B2 * | 9/2012 | Smoot | B62K 11/007 180/24.03 |
| 8,274,406 B2 * | 9/2012 | Karlsson | G05D 1/0242 340/988 |
| 8,275,544 B1 * | 9/2012 | Wells | F41G 3/06 342/146 |
| 8,326,469 B2 * | 12/2012 | Phillips | G05D 1/0088 701/2 |
| 8,330,639 B2 | 12/2012 | Wong et al. | |
| 8,352,643 B2 * | 1/2013 | Birnbaum | A63F 13/28 710/16 |
| 8,355,818 B2 * | 1/2013 | Nielsen | G05D 1/0088 700/258 |
| 8,364,136 B2 * | 1/2013 | Hoffberg | H04N 21/4131 455/418 |
| 8,376,756 B2 | 2/2013 | Robb | |
| 8,392,065 B2 | 3/2013 | Tolstedt et al. | |
| 8,396,611 B2 * | 3/2013 | Phillips | G05D 1/0274 701/2 |
| 8,400,619 B1 | 3/2013 | Bernstein et al. | |
| 8,417,384 B2 * | 4/2013 | Togawa | A63F 13/213 901/1 |
| 8,430,192 B2 * | 4/2013 | Gillett | H04M 1/72415 180/2.2 |
| 8,442,661 B1 | 5/2013 | Blackwell et al. | |
| 8,456,298 B2 * | 6/2013 | Valtonen | A61B 5/1112 340/568.1 |
| 8,459,383 B1 * | 6/2013 | Burget | B60B 19/003 180/7.1 |
| 8,522,902 B2 * | 9/2013 | Gomi | B62K 11/007 180/21 |
| 8,523,846 B2 | 9/2013 | Makino | |
| 8,540,038 B1 | 9/2013 | Ullman | |
| 8,571,781 B2 * | 10/2013 | Bernstein | B62D 61/00 701/99 |
| 8,577,595 B2 * | 11/2013 | Zhao | G01C 21/20 701/410 |
| 8,600,600 B2 * | 12/2013 | Jung | H02K 41/03 701/41 |
| 8,670,889 B2 | 3/2014 | Kaznov | |
| 8,672,062 B2 | 3/2014 | Schroll et al. | |
| 8,751,063 B2 | 6/2014 | Bernstein et al. | |
| 8,766,983 B2 | 7/2014 | Marks et al. | |
| 8,788,130 B1 | 7/2014 | Tran et al. | |
| 8,805,947 B1 | 8/2014 | Kuzkin | |
| 8,811,675 B2 | 8/2014 | Chadranshekar | |
| 8,838,273 B2 | 9/2014 | Hvass et al. | |
| 8,854,392 B2 | 10/2014 | Child | |
| 8,862,301 B2 | 10/2014 | Araki et al. | |
| 8,882,559 B2 | 11/2014 | Fessenmaier | |
| 8,885,882 B1 | 11/2014 | Yin et al. | |
| 9,008,860 B2 | 4/2015 | Waldock | |
| 9,011,197 B2 * | 4/2015 | Smoot | A63F 9/34 446/362 |
| 9,014,848 B2 | 4/2015 | Farlow et al. | |
| 9,041,622 B2 | 5/2015 | McCulloch | |
| 9,090,214 B2 | 7/2015 | Bernstein et al. | |
| 9,114,838 B2 | 8/2015 | Bernstein et al. | |
| 9,150,263 B2 | 10/2015 | Bernstein et al. | |
| 9,171,211 B2 | 10/2015 | Keat | |
| 9,193,404 B2 | 11/2015 | Bernstein et al. | |
| 9,211,920 B1 | 12/2015 | Bernstein et al. | |
| 9,218,316 B2 | 12/2015 | Bernstein et al. | |
| 9,280,717 B2 | 3/2016 | Polo et al. | |
| 9,290,220 B2 | 3/2016 | Bernstein et al. | |
| 9,292,758 B2 | 3/2016 | Polo et al. | |
| 9,389,612 B2 | 7/2016 | Bernstein et al. | |
| 9,394,016 B2 | 7/2016 | Bernstein et al. | |
| 9,395,725 B2 | 7/2016 | Berstein et al. | |
| 9,429,940 B2 | 8/2016 | Bernstein et al. | |
| 9,457,730 B2 | 10/2016 | Berstein et al. | |
| 9,481,410 B2 | 11/2016 | Bernstein et al. | |
| 9,483,876 B2 | 11/2016 | Polo et al. | |
| 9,558,612 B2 | 1/2017 | Lyons | |
| 10,423,155 B2 * | 9/2019 | Bernstein | A63H 30/04 |
| 2002/0011368 A1 | 1/2002 | Berg | |
| 2002/0036104 A1 | 3/2002 | Kerrebrock et al. | |
| 2002/0142701 A1 | 10/2002 | Rosenberg | |
| 2003/0093182 A1 | 5/2003 | Yokoyama | |
| 2003/0118217 A1 | 6/2003 | Kondo et al. | |
| 2003/0179176 A1 | 9/2003 | Waterston | |
| 2003/0216834 A1 | 11/2003 | Allard | |
| 2003/0216835 A1 | 11/2003 | Wakui | |
| 2004/0002843 A1 | 1/2004 | Robarts et al. | |
| 2004/0013295 A1 | 1/2004 | Sabe | |
| 2004/0015266 A1 | 1/2004 | Skoog | |
| 2004/0158357 A1 | 8/2004 | Lee et al. | |
| 2004/0168837 A1 | 9/2004 | Michaud et al. | |
| 2004/0182614 A1 * | 9/2004 | Wakui | G06N 3/008 180/7.1 |
| 2004/0186623 A1 | 9/2004 | Dooley et al. | |
| 2004/0192163 A1 | 9/2004 | Siegel | |
| 2004/0198159 A1 | 10/2004 | Xu et al. | |
| 2005/0004723 A1 | 1/2005 | Duggan et al. | |
| 2005/0041839 A1 | 2/2005 | Saitou | |
| 2005/0091684 A1 | 4/2005 | Kawabata | |
| 2005/0186884 A1 | 8/2005 | Evans | |
| 2005/0216186 A1 | 9/2005 | Dorfman | |
| 2005/0226192 A1 | 10/2005 | Red | |
| 2005/0264472 A1 | 12/2005 | Rast | |
| 2006/0080802 A1 | 4/2006 | Tani | |
| 2006/0095158 A1 | 5/2006 | Lee et al. | |
| 2006/0101465 A1 | 5/2006 | Kato et al. | |
| 2006/0132318 A1 | 6/2006 | Shimizu | |
| 2006/0164261 A1 | 7/2006 | Stiffler | |
| 2006/0241812 A1 | 10/2006 | Juang | |
| 2006/0271251 A1 | 11/2006 | Hopkins | |
| 2007/0034734 A1 | 2/2007 | Yoeli | |
| 2007/0078004 A1 | 4/2007 | Suzuki | |
| 2007/0085076 A1 | 4/2007 | Feyereisen et al. | |
| 2007/0112462 A1 | 5/2007 | Kim et al. | |
| 2007/0150103 A1 | 6/2007 | Im | |
| 2007/0162862 A1 | 7/2007 | Ogasawara | |
| 2007/0192910 A1 | 8/2007 | Vu | |
| 2007/0215394 A1 | 9/2007 | Sun | |
| 2007/0249422 A1 | 10/2007 | Podoloff | |
| 2007/0259592 A1 | 11/2007 | Imai et al. | |
| 2007/0279494 A1 | 12/2007 | Aman | |
| 2007/0282484 A1 | 12/2007 | Chung et al. | |
| 2007/0296170 A1 * | 12/2007 | Field | B62D 61/00 280/47.131 |
| 2008/0009965 A1 | 1/2008 | Bruemmer et al. | |
| 2008/0012518 A1 | 1/2008 | Yamamoto | |
| 2008/0033641 A1 | 2/2008 | Medalia | |
| 2008/0077284 A1 | 3/2008 | Swope | |
| 2008/0082208 A1 | 4/2008 | Hong | |
| 2008/0086236 A1 | 4/2008 | Saito | |
| 2008/0086241 A1 | 4/2008 | Phillips et al. | |
| 2008/0121097 A1 | 5/2008 | Rudakevych et al. | |
| 2008/0174268 A1 | 7/2008 | Koo et al. | |
| 2008/0174448 A1 | 7/2008 | Hudson | |
| 2008/0182479 A1 | 7/2008 | Elliott et al. | |
| 2008/0240507 A1 | 10/2008 | Niwa et al. | |
| 2008/0263628 A1 | 10/2008 | Normal et al. | |
| 2008/0267450 A1 | 10/2008 | Sugimoto et al. | |
| 2008/0269949 A1 | 10/2008 | Norman et al. | |

(56) References Cited

U.S. PATENT DOCUMENTS

| | | |
|---|---|---|
| 2009/0016583 A1 | 1/2009 | Wolf |
| 2009/0018712 A1 | 1/2009 | Duncan |
| 2009/0028439 A1 | 1/2009 | Elangovan et al. |
| 2009/0033623 A1 | 2/2009 | Lin |
| 2009/0055019 A1 | 2/2009 | Stiehl et al. |
| 2009/0057238 A1 | 3/2009 | Garti |
| 2009/0069084 A1 | 3/2009 | Reece |
| 2009/0073034 A1 | 3/2009 | Linsky et al. |
| 2009/0078484 A1* | 3/2009 | Kocijan .................. B66C 1/06 280/612 |
| 2009/0081923 A1 | 3/2009 | Dooley et al. |
| 2009/0118020 A1 | 5/2009 | Koivisto |
| 2009/0133467 A1 | 5/2009 | Mori et al. |
| 2009/0138232 A1 | 5/2009 | Fuwa |
| 2009/0153349 A1 | 6/2009 | Lin |
| 2009/0157221 A1 | 6/2009 | Sip |
| 2009/0161983 A1 | 6/2009 | Ciurea |
| 2009/0164638 A1 | 6/2009 | Jang |
| 2009/0171516 A1 | 7/2009 | Reich |
| 2009/0187299 A1 | 7/2009 | Fregene |
| 2009/0198371 A1 | 8/2009 | Emanuel et al. |
| 2009/0204261 A1 | 8/2009 | Strand et al. |
| 2009/0222148 A1 | 9/2009 | Knotts et al. |
| 2009/0226035 A1 | 9/2009 | Lihoshi et al. |
| 2009/0245656 A1 | 10/2009 | Hu |
| 2009/0256822 A1 | 10/2009 | Amireh et al. |
| 2009/0256912 A1 | 10/2009 | Rosenberg |
| 2009/0257741 A1 | 10/2009 | Greb |
| 2009/0262074 A1 | 10/2009 | Nasiri et al. |
| 2009/0265671 A1 | 10/2009 | Sachs et al. |
| 2009/0278932 A1 | 11/2009 | Yi |
| 2009/0284553 A1 | 11/2009 | Seydoux |
| 2009/0316012 A1 | 12/2009 | Matos |
| 2010/0002909 A1 | 1/2010 | Lefevre et al. |
| 2010/0004798 A1 | 1/2010 | Bodin et al. |
| 2010/0010669 A1 | 1/2010 | Lee et al. |
| 2010/0010672 A1 | 1/2010 | Wang et al. |
| 2010/0014825 A1 | 1/2010 | Curtis |
| 2010/0032224 A1 | 2/2010 | Liu |
| 2010/0057059 A1 | 3/2010 | Makino |
| 2010/0063652 A1 | 3/2010 | Anderson et al. |
| 2010/0066676 A1 | 3/2010 | Kramer et al. |
| 2010/0084513 A1 | 4/2010 | Gariepy et al. |
| 2010/0090661 A1 | 4/2010 | Chen et al. |
| 2010/0106344 A1 | 4/2010 | Edwards et al. |
| 2010/0145236 A1 | 6/2010 | Greenberg et al. |
| 2010/0169098 A1 | 7/2010 | Patch |
| 2010/0172287 A1 | 7/2010 | Krieter |
| 2010/0178982 A1 | 7/2010 | Ehrman |
| 2010/0183195 A1 | 7/2010 | Sharma |
| 2010/0234993 A1 | 9/2010 | Seelinger et al. |
| 2010/0241289 A1 | 9/2010 | Sandberg |
| 2010/0261526 A1 | 10/2010 | Anderson et al. |
| 2010/0264756 A1* | 10/2010 | Lee .................... H02N 15/00 310/90.5 |
| 2010/0283988 A1 | 11/2010 | Mosier et al. |
| 2010/0302247 A1 | 12/2010 | Perez et al. |
| 2010/0302359 A1 | 12/2010 | Adams |
| 2010/0305778 A1 | 12/2010 | Dorneich et al. |
| 2010/0305781 A1 | 12/2010 | Felix |
| 2010/0312917 A1 | 12/2010 | Allport |
| 2010/0324753 A1 | 12/2010 | Okumatsu |
| 2011/0003640 A9 | 1/2011 | Ehrman |
| 2011/0018731 A1 | 1/2011 | Linsky et al. |
| 2011/0018794 A1 | 1/2011 | Linsky et al. |
| 2011/0022196 A1 | 1/2011 | Linsky et al. |
| 2011/0035054 A1 | 2/2011 | Gal et al. |
| 2011/0050940 A1 | 3/2011 | Lanz et al. |
| 2011/0060492 A1* | 3/2011 | Kaznov .................. B60L 53/00 701/23 |
| 2011/0065488 A1 | 3/2011 | Okamura et al. |
| 2011/0071652 A1 | 3/2011 | Brown et al. |
| 2011/0071702 A1 | 3/2011 | Wang et al. |
| 2011/0078623 A1 | 3/2011 | Liu |
| 2011/0082566 A1 | 4/2011 | Herr et al. |
| 2011/0087371 A1 | 4/2011 | Sandberg et al. |
| 2011/0138416 A1 | 6/2011 | Kang et al. |
| 2011/0153885 A1 | 6/2011 | Mak et al. |
| 2011/0156943 A1 | 6/2011 | Wong et al. |
| 2011/0174565 A1 | 7/2011 | Rochat |
| 2011/0183732 A1 | 7/2011 | Block et al. |
| 2011/0184590 A1 | 7/2011 | Duggan et al. |
| 2011/0201362 A1 | 8/2011 | Bregman-Amitai et al. |
| 2011/0132671 A1 | 9/2011 | Lee et al. |
| 2011/0213278 A1 | 9/2011 | Horak et al. |
| 2011/0228092 A1 | 9/2011 | Park |
| 2011/0231013 A1 | 9/2011 | Smoot et al. |
| 2011/0234488 A1 | 9/2011 | Ge et al. |
| 2011/0237324 A1 | 9/2011 | Clavin et al. |
| 2011/0246904 A1 | 10/2011 | Pinto |
| 2011/0249869 A1 | 10/2011 | Stoeffler |
| 2011/0250967 A1 | 10/2011 | Kulas |
| 2011/0249074 A1 | 11/2011 | Cranfill |
| 2011/0273379 A1 | 11/2011 | Chen et al. |
| 2011/0283223 A1 | 11/2011 | Vaittinen et al. |
| 2011/0285349 A1 | 11/2011 | Widmer et al. |
| 2011/0286631 A1 | 11/2011 | Wagner et al. |
| 2011/0291926 A1 | 12/2011 | Gokturk et al. |
| 2011/0294397 A1 | 12/2011 | Tsai |
| 2011/0301901 A1 | 12/2011 | Panagas |
| 2011/0304633 A1 | 12/2011 | Beardsley |
| 2011/0308873 A1* | 12/2011 | Kim .................... B62D 61/00 180/218 |
| 2011/0313568 A1* | 12/2011 | Blackwell ............ B25J 9/1045 901/1 |
| 2011/0320153 A1 | 12/2011 | Lightcap |
| 2011/0320830 A1 | 12/2011 | Ito |
| 2012/0009845 A1 | 1/2012 | Schmelzer |
| 2012/0035799 A1 | 2/2012 | Ehrmann |
| 2012/0043149 A1 | 2/2012 | Kim et al. |
| 2012/0043172 A1 | 2/2012 | Ichikawa |
| 2012/0059520 A1 | 3/2012 | Kossett |
| 2012/0065747 A1 | 3/2012 | Brown et al. |
| 2012/0072023 A1 | 3/2012 | Ota |
| 2012/0083945 A1 | 4/2012 | Oakley et al. |
| 2012/0083962 A1 | 4/2012 | Sato et al. |
| 2012/0086727 A1 | 4/2012 | Korah |
| 2012/0099756 A1 | 4/2012 | Sherman et al. |
| 2012/0100915 A1 | 4/2012 | Margalit et al. |
| 2012/0106783 A1 | 5/2012 | Chang et al. |
| 2012/0112553 A1 | 5/2012 | Stoner |
| 2012/0129605 A1 | 5/2012 | Livet |
| 2012/0143482 A1 | 6/2012 | Goossen et al. |
| 2012/0146775 A1 | 6/2012 | Kudo et al. |
| 2012/0147197 A1 | 6/2012 | Hjelmstrom |
| 2012/0149359 A1 | 6/2012 | Huang |
| 2012/0155724 A1 | 6/2012 | Kitamura |
| 2012/0167014 A1 | 6/2012 | Joo et al. |
| 2012/0168240 A1 | 7/2012 | Wilson |
| 2012/0173018 A1 | 7/2012 | Allen et al. |
| 2012/0173047 A1 | 7/2012 | Bernstein et al. |
| 2012/0173050 A1 | 7/2012 | Berstein et al. |
| 2012/0185115 A1 | 7/2012 | Dean |
| 2012/0193154 A1 | 8/2012 | Wellborn et al. |
| 2012/0197439 A1 | 8/2012 | Wang et al. |
| 2012/0200380 A1 | 8/2012 | Kocijan |
| 2012/0215355 A1* | 8/2012 | Bewley ................ B25J 5/005 700/258 |
| 2012/0229647 A1 | 9/2012 | Calman et al. |
| 2012/0232977 A1 | 9/2012 | Calman et al. |
| 2012/0233015 A1 | 9/2012 | Calman et al. |
| 2012/0240077 A1 | 9/2012 | Vaittinen et al. |
| 2012/0243730 A1 | 9/2012 | Outtagarts |
| 2012/0244969 A1 | 9/2012 | Binder |
| 2012/0258645 A1 | 10/2012 | Cheng |
| 2012/0262002 A1 | 10/2012 | Widmer et al. |
| 2012/0263154 A1 | 10/2012 | Blanchflower et al. |
| 2012/0291926 A1 | 11/2012 | Misra et al. |
| 2012/0293548 A1 | 11/2012 | Perez et al. |
| 2012/0298049 A1 | 11/2012 | Cook et al. |
| 2012/0298430 A1 | 11/2012 | Schroll et al. |
| 2012/0302129 A1 | 11/2012 | Persaud |
| 2012/0306850 A1 | 12/2012 | Balan et al. |
| 2012/0307001 A1 | 12/2012 | Osako et al. |

(56) References Cited

U.S. PATENT DOCUMENTS

| | | |
|---|---|---|
| 2012/0309261 A1 | 12/2012 | Boman |
| 2012/0311810 A1 | 12/2012 | Gilbert et al. |
| 2013/0022274 A1 | 1/2013 | Lawrence |
| 2013/0040533 A1 | 2/2013 | Miller |
| 2013/0050069 A1 | 2/2013 | Ota |
| 2013/0065482 A1 | 3/2013 | Trickett |
| 2013/0105239 A1 | 5/2013 | Fung |
| 2013/0109272 A1 | 5/2013 | Rindlishbacher |
| 2013/0113307 A1 | 5/2013 | Kim et al. |
| 2013/0143482 A1 | 6/2013 | Regier |
| 2013/0178257 A1 | 7/2013 | Lengseth |
| 2013/0200207 A1 | 8/2013 | Pongratz |
| 2013/0259386 A1 | 10/2013 | Chadranshekar |
| 2013/0265225 A1 | 10/2013 | Nasiri et al. |
| 2013/0293584 A1 | 11/2013 | Anderson et al. |
| 2013/0307875 A1 | 11/2013 | Anderson et al. |
| 2013/0335301 A1 | 12/2013 | Wong et al. |
| 2014/0008496 A1 | 1/2014 | Ye |
| 2014/0015493 A1 | 1/2014 | Wirz et al. |
| 2014/0051513 A1 | 2/2014 | Polo et al. |
| 2014/0120887 A1 | 5/2014 | Huang |
| 2014/0176487 A1 | 6/2014 | Kikuchi |
| 2014/0207280 A1 | 7/2014 | Duffley |
| 2014/0238762 A1 | 8/2014 | Berberian et al. |
| 2014/0249697 A1 | 9/2014 | Fredriksson |
| 2014/0371954 A1 | 12/2014 | Lee et al. |
| 2015/0091697 A1 | 4/2015 | Takayasu |
| 2015/0175202 A1 | 6/2015 | MacGregor |
| 2015/0209664 A1 | 7/2015 | Haseltine |
| 2015/0268666 A1 | 9/2015 | Wang et al. |
| 2016/0033967 A1 | 2/2016 | Bernstein et al. |
| 2016/0054734 A1 | 2/2016 | Bernstein et al. |
| 2016/0148367 A1 | 5/2016 | Polo et al. |
| 2016/0202696 A1 | 7/2016 | Bernstein et al. |
| 2016/0246299 A1 | 8/2016 | Berberian et al. |
| 2016/0282871 A1 | 9/2016 | Berstein et al. |
| 2016/0291591 A1 | 10/2016 | Bernstein et al. |
| 2016/0291595 A1 | 10/2016 | Halloran |
| 2016/0349748 A1 | 12/2016 | Bernstein et al. |
| 2017/0080352 A1 | 3/2017 | Bernstein et al. |
| 2017/0092009 A1 | 3/2017 | Polo et al. |
| 2018/0224845 A1 | 8/2018 | Bernstein et al. |
| 2018/0296911 A1 | 10/2018 | Polo et al. |

OTHER PUBLICATIONS

U.S. Appl. No. 15/822,676, Office Action dated Nov. 30, 2018, 27 pages.

U.S. Appl. No. 14/933,827, Notice of Allowance dated Nov. 16, 2018, 6 pages.

U.S. Appl. No. 15/146,631, Notice of Allowance dated Oct. 11, 2018, 2 pages.

U.S. Appl. No. 15/281,409, Amendment and Response filed Jan. 7, 2019, 16 pages.

U.S. Appl. No. 14/271,203, Notice of Allowance dated Dec. 18, 2018, 7 pages.

U.S. Appl. No. 14/933,827, Notice of Allowance dated Dec. 18, 2018, 2 pages.

Chinese Notice of Allowance in 201480029695.4, dated Jan. 15, 2019, 4 pages.

* cited by examiner

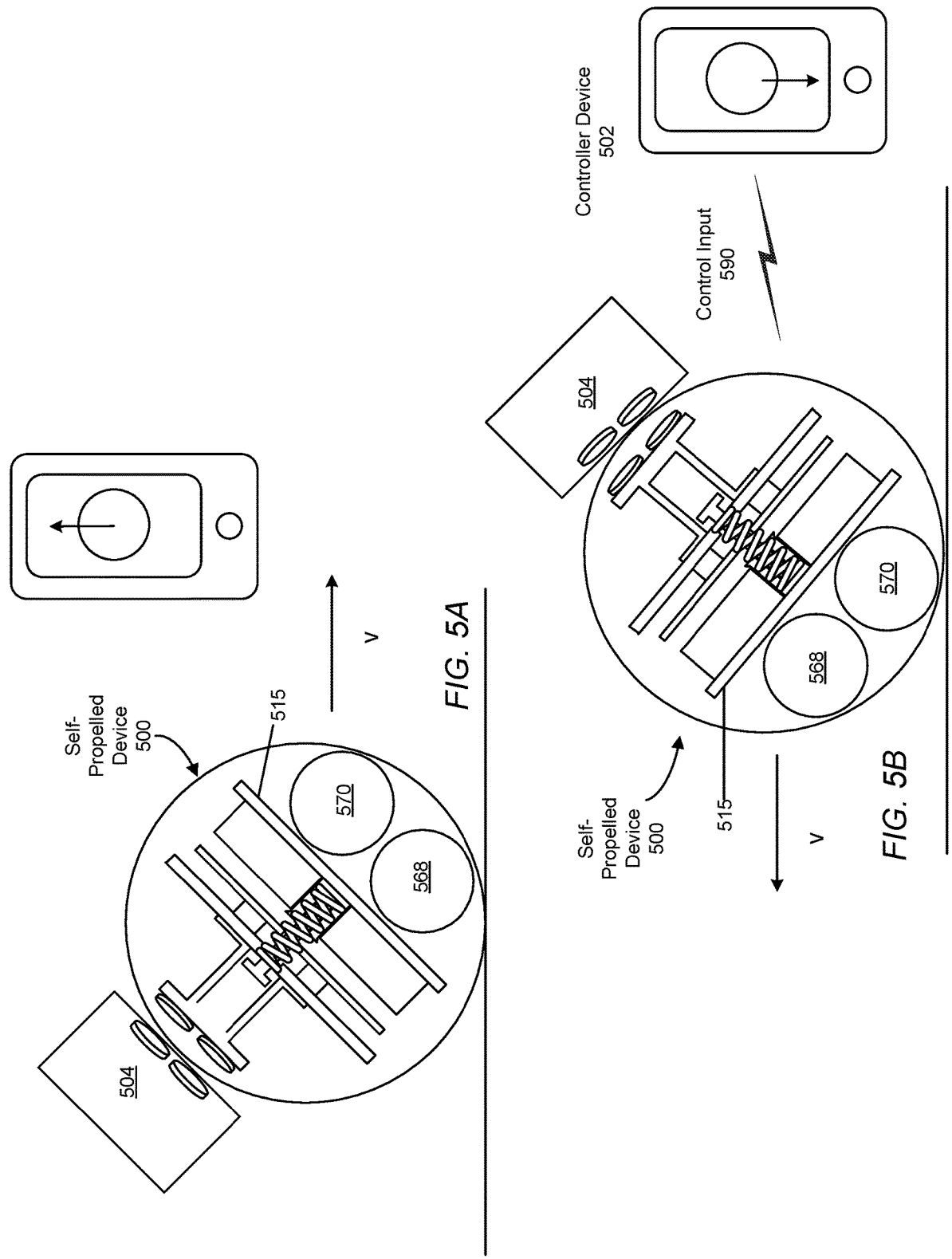

SELF PROPELLED DEVICE WITH MAGNETIC COUPLING

RELATED APPLICATIONS

This application is a Continuation of U.S. patent application Ser. No. 14/975,510, entitled "SELF-PROPELLED DEVICE WITH MAGNETIC COUPLING," filed on Dec. 18, 2015, which is a Continuation of U.S. patent application Ser. No. 14/691,349, entitled "SELF-PROPELLED DEVICE WITH MAGNETIC COUPLING," filed Apr. 20, 2015, which application claims the benefit of U.S. Provisional Application Ser. No. 62/149,441, entitled "SELF-PROPELLED DEVICE WITH MAGNETIC COUPLING" filed Apr. 17, 2015. Said application Ser. No. 14/691,349 is also a Continuation-in-part of U.S. patent application Ser. No. 14/459,235, entitled "MAGNETICALLY COUPLED ACCESSORY FOR A SELF-PROPELLED DEVICE", filed Aug. 13, 2014; which is a Continuation-in-part of U.S. patent application Ser. No. 14/035,841, entitled "SELF-PROPELLED DEVICE WITH ACTIVELY ENGAGED DRIVE SYSTEM," filed Sep. 24, 2013; which is a Continuation of U.S. patent application Ser. No. 13/342,853, entitled "SELF-PROPELLED DEVICE WITH ACTIVELY ENGAGED DRIVE SYSTEM," filed Jan. 3, 2012, now U.S. Pat. No. 8,571,781, issued Oct. 29, 2013; which claims priority under 35 U.S.C. § 119(e) to (i) U.S. Provisional Patent Application Ser. No. 61/430,023, entitled "METHOD AND SYSTEM FOR CONTROLLING A ROBOTIC DEVICE," filed Jan. 5, 2011; (ii) U.S. Provisional Patent Application Ser. No. 61/430,083, entitled "METHOD AND SYSTEM FOR ESTABLISHING 2-WAY COMMUNICATION FOR CONTROLLING A ROBOTIC DEVICE," filed Jan. 5, 2011; and (iii) U.S. Provisional Patent Application Ser. No. 61/553,923, entitled "A SELF-PROPELLED DEVICE AND SYSTEM AND METHOD FOR CONTROLLING SAME," filed Oct. 31, 2011; all of the aforementioned priority applications being hereby incorporated by reference in their respective entirety.

BACKGROUND

Remote controlled devices have previously been operated using specialized remote controllers specific to a particular device. Accessories to remote controlled devices typically involve physical fastening means to connect the accessories to portions of a frame or housing.

BRIEF DESCRIPTION OF THE DRAWINGS

The disclosure herein is illustrated by way of example, and not by way of limitation, in the figures of the accompanying drawings and in which like reference numerals refer to similar elements, and in which:

FIG. 5A and FIG. 5B illustrate a self-propelled device in motion while magnetically coupled to an accessory device, according to one or more embodiments;

DETAILED DESCRIPTION

Figure 1:
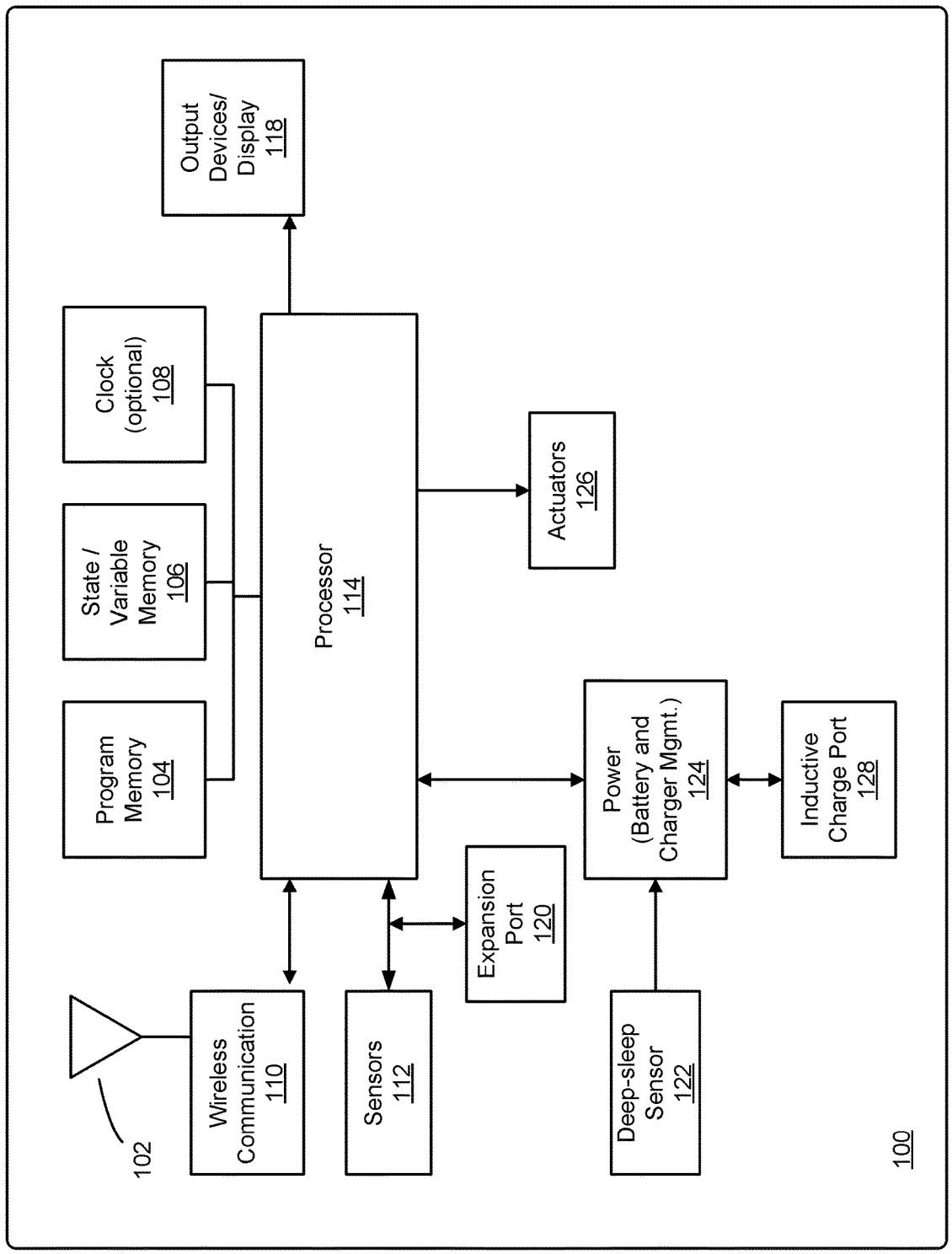
FIG. 1 is an example block diagram illustrating a system to control operation of a self-propelled device.

A self-propelled device is provided that includes a spherical housing and an internal drive system including one or more motors coupled to one or more wheels engaged to an inner surface of the spherical housing. A biasing assembly, including a number of biasing elements to contact an inner surface of the spherical housing, is coupled to the internal drive system to force the wheels to continuously engage the inner surface to allow for power to the motors to be transferred to the inner surface of the spherical housing, causing the self-propelled device to roll and maneuver along a surface. The self-propelled device can rotate based on a combination of movement of its center of mass, independent power to the motors, and the force of the biasing elements against the inner surface. Magnetically interactive components or elements may be included within the spherical housing. The magnetically interactive components or elements can be comprised of ferrous metal or permanent magnets, such as neodymium magnets, to provide a magnetic field through the spherical housing to magnetically interact with an external accessory.

In some examples, the spherical housing of the self-propelled device is caused to roll and maneuver while the external accessory remains under magnetic interaction with the magnetically interactive components within the spherical housing, coupling the external accessory to the spherical housing. The accessory device can remain within a constant relative portion or area on the exterior surface of the spherical housing (e.g., a top portion) as the self-propelled device rolls.

The self-propelled device, the external accessory, or both can include any number of magnets (e.g., neodymium magnets) to produce a magnetic interaction sufficient to maintain the magnetic coupling. Such interaction may involve a magnetic attraction in which contact occurs between the external accessory and the outer surface of the spherical housing. In such examples, friction may be reduced by coating the outer surface of the spherical housing and/or a contact surface of the external accessory with a substantially frictionless material. The external accessory can include a contact portion composed of a slider bearing, wheel bearings, or one or more wheels that engage the exterior surface of the spherical housing.

Additionally or alternatively, the magnetic interaction may involve a repulsive force including a stability mechanism (e.g., one or more further magnets) to create stable magnetic levitation between the external accessory and the spherical housing.

Throughout this disclosure, the term "substantially" may be used in varying context for purpose of expressly introducing a qualitative approximation to a statement. In many contexts, the term can be interpreted to mean at least 75% of a stated quantity, comparison, or measurement. In the context of an angular measurement, the term "substantially" means between zero degrees and less than 90 degrees of angular rotation relative to a referenced structure within the spherical housing when the self-propelled device is in motion. Accordingly, the term may be used in context as, for example, "substantially" stable, a "substantially" constant angle, "substantially" at a particular position on a rolling or stationary sphere, or "substantially" perpendicular with respect to an underlying surface on which the self-propelled device rolls. In such contexts, "substantially" can mean less than a 90 degree differential with respect to a vertical (or perpendicular) reference axis to the underlying surface, and typically less than 45 degrees, with respect to the vertical axis, while the self-propelled device is in a non-accelerated state. Thus, for example, as the self-propelled device is operated, the external accessory can remain within magnetic interaction with magnetically interactive elements within the spherical housing and residing on or within substantially vertically oriented components. As further used herein, "substantially" in the context of friction between the outer surface of the spherical housing and the contact surface of the external accessory device, means a below normal frictional relation between two typical smooth surfaces (e.g., polished metal or wood surfaces). Thus, a "substantially" frictionless material means a material designed or manufactured for reduced friction such as a TEFLON® or a DELRIN® coating.

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules or components of a system. A programmatic module or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. For example, one or more examples described herein can be implemented, in whole or in part, on computing devices such as digital cameras, digital camcorders, desktop computers, cellular or smart phones, personal digital assistants (PDAs), laptop computers, printers, digital picture frames, and tablet devices. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples can be carried and/or executed. In particular, the numerous machines shown with examples include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smart phones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a non-transitory computer usable carrier medium capable of carrying such a program.

System Description

Referring now to the drawings, FIG. 1 is an example block diagram illustrating a system to control operation of a self-propelled device 100. The self-propelled device 100 can be operated to move under control of another device, such as a computing device operated by a user. The self-propelled device 100 can be configured with resources that enable one or more of the following: (i) maintain self-awareness of orientation and/or position relative to an initial reference frame after the device initiates movement; (ii) process control input programmatically, so as to enable a diverse range of program-specific responses to different control inputs; (iii) enable another device to control its movement using software or programming logic that is communicative with programming logic on the self-propelled device; and/or (iv) generate an output response for its movement and state that it is software interpretable by the control device.

The self-propelled device 100 can include several interconnected subsystems and modules. A processor 114 can execute programmatic instructions from a program memory 104. The instructions stored in the program memory 104 can be changed, for example to add features, correct flaws, or modify behavior. In some variations, the program memory 104 stores programming instructions that are communicative or otherwise operable with software executing on a linked controller device. The processor 114 is configured to execute different programs of programming instructions, in order to alter the manner in which the self-propelled device 100 interprets or otherwise responds to command input ("commands") from different sources. As described herein, the self-propelled device 100 may have multiple modes of operation, including the self-propelled device 100 being controlled by a computing device providing commands, the self-propelled device 100 being a controller for another device, and/or the self-propelled device 100 being partially or wholly self-controlled.

In some examples, the self-propelled device 100 can share a computing platform with a computing device on which programming logic is shared, in order to: (i) enable the user to operate the computing device to generate multiple kinds of input, including simple directional input, command input, gesture input, motion or other sensory input, voice input or combinations thereof to operate the self-propelled device 100; (ii) enable the self-propelled device 100 to interpret input received from the computing device as a command or set of commands; and/or (iii) enable the self-propelled device 100 to communicate data regarding the self-propelled device's position, movement, and/or state in order to effect a state on the computing device (e.g., a display state to include content corresponding to a controller-user interface). In variations, the self-propelled device 100 can further provide a programmatic interface (e.g., on a display 118) that facilitates additional programming logic and/or instructions to operate the self-propelled device 100. The computing device can execute programming that is communicative with the programming logic on the self-propelled device 100.

A wireless communication port 110, in conjunction with a communication transducer 102, serves to exchange data between the processor 114 and other external devices. The data exchanges, for example, provide communications, control, logical instructions, state information, and/or updates for the program memory 104. The processor 114 can generate output corresponding to state and/or position information, communicated to the controller device via the wireless communication port 110. The mobility of the self-propelled device 100 may make wired connections undesirable. Thus, the term "connection" may be understood to mean a logical connection, such as a wireless link (e.g., BLUETOOTH), made without a physical connection to self-propelled device 100.

In variations, the wireless communication port 110 implements the BLUETOOTH communications protocol and the transducer 102 is an antenna suitable for transmission and reception of BLUETOOTH radio signals. Other wireless communication mediums and protocols may also be used in alternative implementations.

Sensors 112 can provide information about the surrounding environment and condition to the processor 114. In some variations, the sensors 112 include inertial measurement devices, including a three-axis gyroscope, a three-axis accelerometer, and/or a three-axis magnetometer. According to some variations, the sensors 112 provide input to enable the processor 114 to maintain awareness of the device's orientation and/or position relative to an initial reference frame after the device initiates movement. In various examples, the sensors 112 include instruments for detecting light, temperature, humidity, and/or measuring chemical concentrations or radioactivity.

State/variable memory 106 stores information about the present state of the system, including, for example, position, orientation, rates of rotation and translation about each axis. The state/variable memory 106 also stores information corresponding to an initial reference frame of the device upon, for example, the device 100 being put in use (e.g., the device 100 being switched on), as well as position and orientation information once the device 100 is in use. In this way, some embodiments provide for the device 100 to utilize information of the state/variable memory 106 in order to maintain position and orientation information of the device 100 once the device 100 starts moving.

A clock 108 provides timing information to the processor 114. In one example, the clock 108 provides a time-base for measuring intervals and rates of change. In similar examples, the clock 108 provides day, date, year, time, and alarm functions. The clock 108 can allow the self-propelled device 100 to provide an alarm or alert at pre-set times.

An expansion port 120 provides a connection for addition of accessories or devices. The expansion port 120 can provide for future expansion, as well as flexibility to add options or enhancements. For example, the expansion port 120 can be used to add peripherals, sensors, processing hardware, storage, displays, or actuators to the basic self-propelled device 100.

In variations, the expansion port 120 provides an interface capable of communicating with a suitably configured component using analog or digital signals. Thus, the expansion port 120 can provide electrical interfaces and protocols that are standard or well-known. Furthermore, the expansion port 120 implements an optical interface. Example interfaces appropriate for expansion port 120 include the Universal Serial Bus (USB), Inter-Integrated Circuit Bus (I2C), Serial Peripheral Interface (SPI), or ETH ERN ET.

A display 118 may be included to present information to outside devices or persons. The display 118 can present information in a variety of forms. In variations, display 118 can produce light in colors and patterns, sound, vibration, music, or combinations of sensory stimuli. In one embodiment, the display 118 operates in conjunction with actuators 126 to communicate information by physical movements of device 100. For example, the device 100 can be made to emulate a human head nod or shake to communicate "yes" or "no."

In variations, the display 118 is an emitter of light, either in the visible or invisible range. Invisible light in the infrared or ultraviolet range may be useful, for example to send information invisible to human senses but available to specialized detectors. In some examples, the display 118 includes an array of Light Emitting Diodes (LEDs) emitting various light frequencies, arranged such that their relative intensity is variable and the light emitted is blended to form color mixtures.

In variations, the display 118 includes an LED array comprising several LEDs, each emitting a human-visible primary color. The processor 114 can vary the relative intensity of each of the LEDs to produce a wide range of colors. Primary colors of light are those in which a few colors can be blended in different amounts to produce a wide gamut of apparent colors. Many sets of primary colors are known, including for example red/green/blue, red/green/blue/white, and red/green/blue/amber. For example, red, green and blue LEDs together can comprise a usable set of three available primary-color devices comprising the display 118. In other examples, other sets of primary colors and white LEDs can be used. The display 118 can further include an LED used to indicate a reference point on the device 100 for alignment.

Power 124 stores energy for operating the electronics and electromechanical components of the device 100. In some examples, power 124 is a rechargeable battery. Furthermore, an inductive charge port 128 can allow for recharging power 124 without a wired electrical connection. In variations, the inductive charge port 128 can accept magnetic energy and convert it to electrical energy to recharge the batteries. The charge port 128 can provide a wireless communication interface with an external charging device.

A deep sleep sensor 122 can be included to place the self-propelled device 100 into a very low power or "deep sleep" mode where most of the electronic devices use no battery power. This may be useful for long-term storage or shipping.

In variations, the deep sleep sensor 122 is non-contact in that it senses through the housing of device 100 without a wired connection. The deep sleep sensor 122 may be a Hall Effect sensor mounted so that an external magnet can be applied at a pre-determined location on device 100 to activate the deep sleep mode.

Actuators 126 may be included to convert electrical energy into mechanical energy for various uses. A primary use of the actuators 126 is to propel and steer self-propelled device 100 over an underlying surface. Movement and steering actuators are also referred to as a drive system or traction system. The drive system moves device 100 in rotation and translation, under control of the processor 114. Examples of actuators 126 include, without limitation, wheels, motors, solenoids, propellers, paddle wheels, and pendulums.

The drive system actuators 126 can include two parallel wheels, each mounted to an axle connected to an independently variable-speed motor through a reduction gear system. Thus, the speeds of the two drive motors can be controlled by the processor 114.

However, it should be appreciated that the actuators 126 can produce a variety of movements in addition to merely rotating and translating the self-propelled device 100. Thus, in some variations, the actuators 126 cause the device 100 to execute communicative or emotionally evocative movements, including emulation of human gestures, for example, head nodding, shaking, trembling, spinning, or flipping. In some variations, the processor 114 coordinates the actuators 126 with the display 118. For example, the processor 114 can provide signals to the actuators 126 and the display 118 to cause the device 100 to spin or tremble and simultaneously emit patterns of colored light. Thus, the device 100 can emit light and/or sound patterns synchronized with movements.

In further variations, the self-propelled device 100 can be used as a controller for other network-connected devices. The device 100 can contain sensors and wireless communication capability, and so it can perform a controller role for other devices. For example, the self-propelled device 100 can be held in the hand and used to sense gestures, movements, rotations, combination inputs, and the like.

In some implementations, self-propelled device 100 is wholly autonomous, meaning the movement of the device 100 is determined from resources that reside on the device 100, either without or independent of input signals from another device acting as a controller. In other implementations, the self-propelled device 100 can operate under various levels of control provided by another device, such as provided by some examples described below with respect to FIGS. 2A-2C. Still further, the self-propelled device 100 can operate in either an autonomous mode, a partially autonomous mode, or a controlled mode.

Figure 2A:
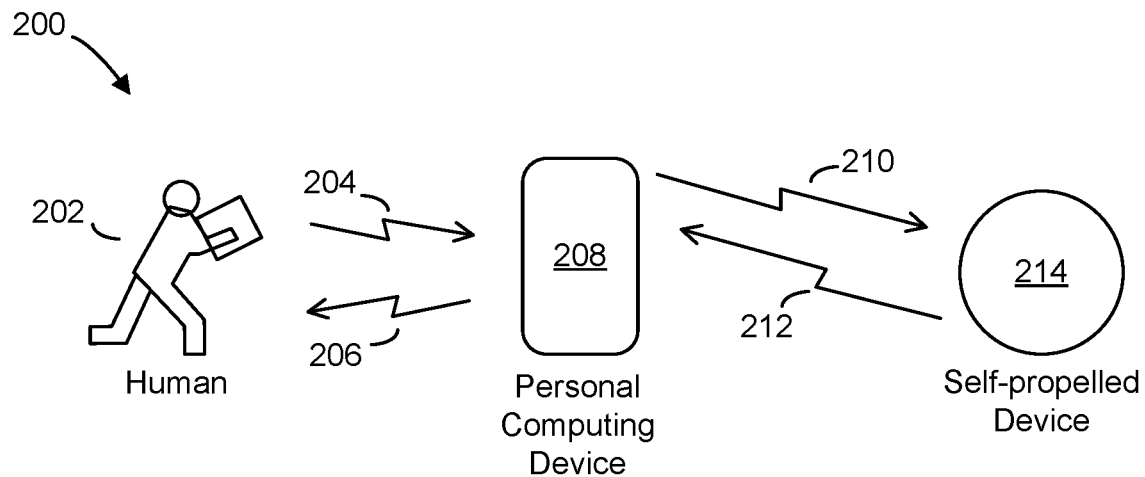
FIG. 2A is a schematic depiction of a self-propelled device and a computing device, under an embodiment.

FIG. 2A is a schematic depiction of a self-propelled device and a computing device, under an embodiment. More specifically, a self-propelled device 214 is controlled in its movement by programming logic and/or controls that can originate from a controller device 208. The self-propelled device 214 is capable of movement under control of the computing device 208, which can be operated by a user 202. The computing device 208 can wirelessly communicate control data to the self-propelled device 214 using a standard or proprietary wireless communication protocol. In variations, the self-propelled device 214 may be at least partially self-controlled, utilizing sensors and internal programming logic to control the parameters of its movement (e.g., velocity, direction, etc.). Still further, the self-propelled device 214 can communicate data relating to the self-propelled device's position and/or movement parameters for the purpose of generating or alternating content on the computing device 208. In additional variations, the self-propelled device 214 can control aspects of the computing device 208 by way of its movements and/or internal programming logic.

As described herein, the self-propelled device 214 may have multiple modes of operation, including the self-propelled device 214 being controlled by the computing device 208, the self-propelled device 214 being a controller for another device (e.g., another self-propelled device or the computing device 208), and/or the self-propelled device 100 being partially or wholly autonomous.

In some examples, the self-propelled device 214 and the computing device 208 can share a computing platform on which programming logic is shared, in order to: (i) enable the user 202 to operate the computing device 208 to generate multiple kinds of input, including simple directional input, command input, gesture input, motion or other sensory input, voice input, or combinations thereof to operate the self-propelled device 214; (ii) enable the self-propelled device 214 to interpret input received from the computing device 208 as a command or set of commands; and/or (iii) enable the self-propelled device 214 to communicate data regarding the self-propelled device's position, movement, and/or state in order to effect a state on the computing device 208 (e.g., a display state to include content corresponding to a controller-user interface). The self-propelled device 214 can further include a programmatic interface that facilitates additional programming logic and/or instructions to use the self-propelled device 214. The computing device 208 can execute programming that is communicative with the programming logic on the self-propelled device 214.

According to embodiments, the self-propelled device 214 includes an actuator or drive mechanism causing motion or directional movement. The self-propelled device 214 may be referred to by a number of related terms and phrases, including controlled device, robot, robotic device, remote device, autonomous device, and remote-controlled device. In some embodiments, the self-propelled device 214 can be structured to move and be controlled in various media. For example, the self-propelled device 214 can be configured for movement in media such as flat surfaces, sandy surfaces, or rocky surfaces.

The self-propelled device 214 may be implemented in various forms. As described with some examples below, the self-propelled device 214 may correspond to a spherical object that can roll and/or perform other movements, such as spinning. In other variations, the self-propelled device 214 can include a cylindrical housing which rotates while the self-propelled device 214 moves. The cylindrical housing can rotate directly on an underlying surface in order to move or translate in a given direction. Alternatively, the cylindrical housing can include external wheels and/or drive system components which move the cylindrical housing, with the cylindrical housing spinning by way of its momentum and free connection to the external drive system, or by way of the cylindrical housing's connection to wheels or other spinning components of the drive system. Still further, the self-propelled device 214 can include housings of other shapes in which the housing rolls or spins. Still further, in other variations, the self-propelled device 214 can include an external accessory that is magnetically coupled to magnetically interactive elements (e.g., metals or magnets) within the housing. The housing of the self-propelled device can include one or more structural elements which maintain a position of a magnetically interactive element within the housing. Still further, the device 214 can correspond to a radio-controlled aircraft, such as an airplane, helicopter, hovercraft, or balloon. In other variations, device 214 can correspond to a radio controlled watercraft, such as a boat or submarine. Numerous other variations may also be implemented, such as those in which the device 214 is a robot. In one embodiment, device 214 includes a sealed hollow envelope, roughly spherical in shape, capable of directional movement by action of actuators inside the enclosing envelope.

Continuing to refer to FIG. 2A, the self-propelled device 214 is configured to communicate with the computing device 208 using network communication links 210 and 212. Link 210 transfers data from the computing device 208 to the self-propelled device 214. Link 212 transfers data from the self-propelled device 214 to the computing device 208. Links 210 and 212 are shown as separate unidirectional links for illustration. In some embodiments, a single bi-directional communication link performs communication in both directions. It should be appreciated that link 210 and link 212 are not necessarily identical in type, bandwidth, or capability. For example, communication link 210 from the computing device 208 to the self-propelled device 214 is often capable of a higher communication rate and bandwidth compared to link 212. In some situations, only one link 210 or 212 is established. In such an embodiment, communication is unidirectional.

The computing device 208 can correspond to any device comprising at least a processor and communication capability suitable for establishing at least uni-directional communications with the self-propelled device 214. Examples of such devices include, without limitation: mobile computing devices (e.g., multifunctional messaging/voice communication devices such as smart phones), tablet computers, portable communication devices, and personal computers. In one embodiment, the computing device 208 is an IPHONE available from APPLE COMPUTER, INC. of Cupertino, California. In another embodiment, the computing device 208 is an IPAD tablet computer, also from APPLE COMPUTER. In another embodiment, the computing device 208 is any of the handheld computing and communication appliances executing the ANDROID operating system from GOOGLE, INC.

In another embodiment, the computing device 208 is a personal computer, in either a laptop or desktop configuration. For example, the computing device 208 can be a multi-purpose computing platform running the MICROSOFT WINDOWS operating system, or the LINUX operating system, or the APPLE OS/X operating system, configured with an appropriate application program to communicate with the self-propelled device 214.

In variations, the computing device 208 can be a specialized device, dedicated for enabling the user 202 to control and interact with the self-propelled device 214.

In one embodiment, multiple types of computing device 208 can be used interchangeably to communicate with the self-propelled device 214. In one embodiment, the self-propelled device 214 is capable of communicating and/or being controlled by multiple devices (e.g., concurrently or one at a time). For example, the self-propelled device 214 can link with an IPHONE in one session and with an ANDROID device in a later session, without modification of the self-propelled device 214.

According to embodiments, the user 202 can interact with the self-propelled device 214 via the computing device 208, in order to control the self-propelled device 214 and/or to receive feedback or interaction on the computing device 208 from the self-propelled device 214. According to embodiments, the user 202 is enabled to specify input 204 through various mechanisms that are provided with the computing device 208. Examples of such inputs include text entry, voice commands, touching a sensing surface or screen, physical manipulations, gestures, taps, shaking, and combinations of the above.

The user 202 may interact with the computing device 208 in order to receive feedback 206. The feedback 206 may be generated on the computing device 208 in response to user input. As an alternative or addition, the feedback 206 may also be based on data communicated from the self-propelled device 214 to the computing device 208 regarding, for example, the self-propelled device's position or state. Without limitation, examples of feedback 206 include text display, graphical display, sound, music, tonal patterns, modulation of color or intensity of light, haptic, vibrational, or tactile stimulation. The feedback 206 may be combined with content that is generated on the computing device 208. For example, the computing device 208 may output content that is modified to reflect position or state information communicated from the self-propelled device 214.

In some embodiments, the computing device 208 and/or the self-propelled device 214 are configured such that user input 204 and feedback 206 maximize usability and accessibility for a user 202 who has limited sensing, thinking, perception, motor or other abilities. This allows users with handicaps or special needs to operate system 200 as described.

It should be appreciated that the configuration illustrated in the embodiment of FIG. 2A is only one of an almost unlimited number of possible configurations of networks including a self-propelled device with communication connections. Furthermore, while numerous embodiments described herein provide for a user to operate or otherwise directly interface with the computing device in order to control and/or interact with a self-propelled device, variations to embodiments described encompass enabling the user to directly control or interact with the self-propelled device 214 without use of an intermediary device, such as the computing device 208.

Figure 2B:
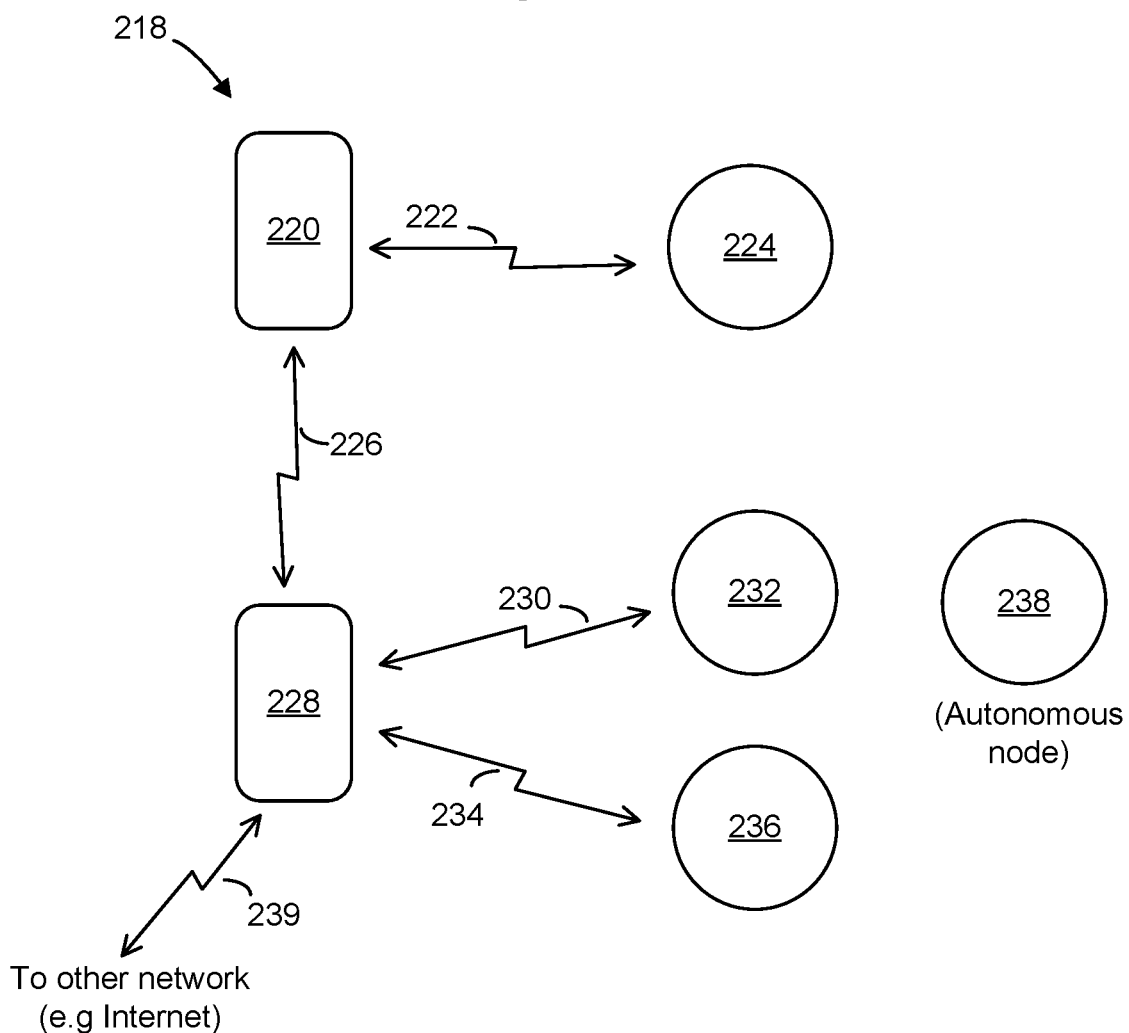
FIG. 2B depicts a system comprising computing devices and self-propelled devices, according to another embodiment.

FIG. 2B depicts a system 218 comprising computing devices and self-propelled devices, according to another embodiment. In the example provided by FIG. 2B, system 218 includes two computing devices 220 and 228, four self-propelled devices 224, 232, 236, and 238, and communication links 222, 226, 230, 234, and 239. The communication of computing device 220 with self-propelled device 224 using link 222 is similar to the embodiment depicted in network 200 of FIG. 2A; however, embodiments such as those shown enable additional communication to be established between two computing devices 220 and 228, via network link 226.

According to an embodiment such as provided with system 218, the computing devices 220, 228 may optionally control more than one self-propelled device. Furthermore, each self-propelled device 224, 232, 236, 238 may be controlled by more than one computing device 220, 228. For example, embodiments provide that computing device 228 can establish multiple communications links, including with self-propelled devices 232 and 236, and computing device 220.

In variations, the computing devices 220, 228 can also communicate with one or more self-propelled devices using a network such as the Internet, or a local wireless network (e.g., a home network). For example, the computing device 228 is shown to have a communications link 239, which can connect the computing device to an Internet server, a web site, or to another computing device at a remote location. In some embodiments, the computing device 228 can serve as an intermediary between the network source and a self-propelled device. For example, the computing device 228 may access programming from the Internet and communicate that programming to one of the self-propelled devices.

As an alternative or variation, the computing device 228 can enable a network user to control the computing device 228 in controlling one or more of the self-propelled devices 232, 236, etc. Still further, the computing device 228 can access the network source in order to receive programmatically triggered commands, such as a command initiated from a network service that causes one or more of the self-propelled devices to update or synchronize using the computing device 228. For example, the self-propelled device 232 may include image capturing resources, and a network source may trigger the computing device 228 to access the images from the self-propelled device, and/or to communicate those images to the network source over the Internet.

In variations, such remote network functionality may alternatively be communicated directly from a network source to the self-propelled devices 224, 232, 236. Thus, computing devices 220, 228 may be optional. Alternatively, computing devices 220, 228 may be separated from the self-propelled devices 224, 232, 236 by a network such as the Internet. Thus, computing devices 220, 228 can alternatively be the network source that remotely controls and/or communicates with the self-propelled devices.

Figure 2C:
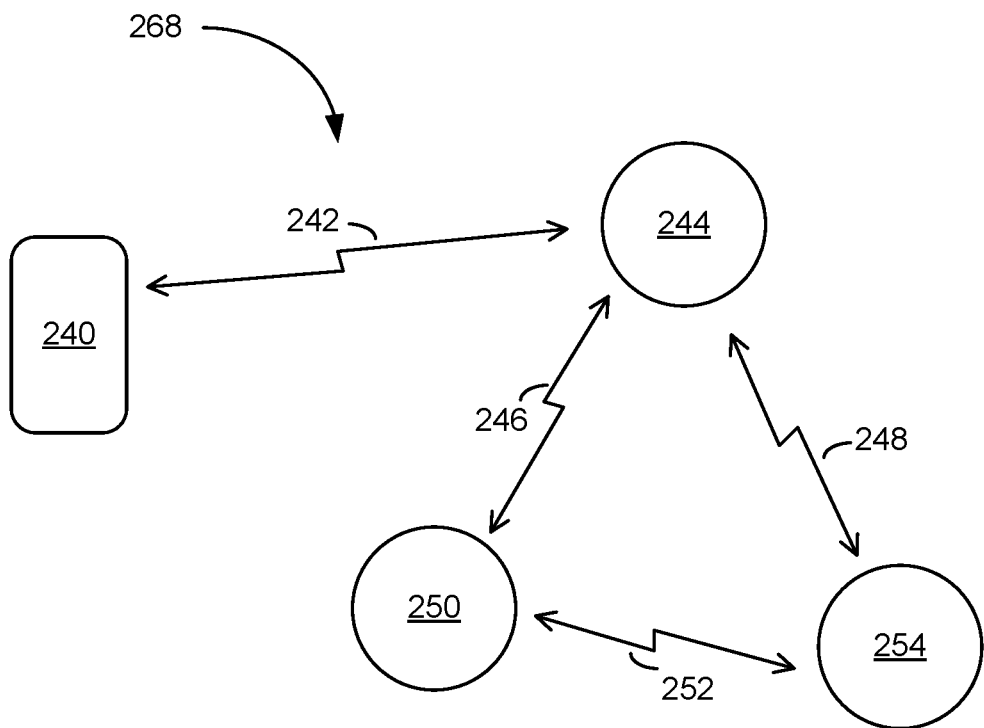
FIG. 2C is a schematic that illustrates a system comprising a computing device and multiple self-propelled devices, under another embodiment.

It should be noted that the data communication links 210, 212, 222, 226, 230, 234, 239, 242, 246, 248, and 252 in FIGS. 2A, 2B, and 2C are depicted as short and direct for purposes of illustration. However, actual links may be much more varied and complex. For example, link 226 connecting two computing devices 220 and 228 may be a low-power wireless link, if devices 220 and 228 are in close proximity. However, computing devices 220 and 228 may be far apart (e.g., separated by miles or geography), so long as suitable network communication can be established.

Thus, link 226 and all of the links 222, 230, 234, and 239 can employ a variety of network technologies, including the Internet, World Wide Web, wireless links, wireless radio-frequency communications utilizing network protocol, optical links, or any available network communication technology. The final connection to self-propelled devices 224, 232, 236, and 238 is preferably wireless so connecting wires do not restrict mobility.

In one embodiment, the communication links 222, 226, 230, and 234 are based on the wireless communication standard for data exchange known as BLUETOOTH. BLUETOOTH is widely available and provides a flexible communication framework for establishing data networks using short-wavelength radio transceivers and data encoding. BLUETOOTH incorporates security features to protect the data sent on the links from unauthorized observers or interference. Alternative wireless communication media may also be employed, such as wireless USB, Wi-Fi, or proprietary wireless communications. In variations, one or more of the communication links to 222, 226, 230, and 234 can utilize short-range radiofrequency (RF) communication, and/or line-of-sight communications.

In various other embodiments, the communication links are based on other wireless communication systems. Various radio frequency data communication systems are available, including for example those known as WI-FI, IEEE 802.11a, IEEE 802.11b, IEEE 802.11g, or IEEE 802.11n. Other radio frequency data links are formed using cellular telephone services or serial communication protocols using radio modems. In other embodiments, optical communication links are employed, including modulating properties of light and LASER beams.

Any suitable communication technology can be used to form the network links, whether presently known or available in the future. The features described herein are not dependent on any particular networking technology or standard.

In some embodiments, the communications established amongst the devices, such as amongst computing devices 220, 228 and/or self-propelled devices 224, 232, 236, can be temporary, flexible and reconfigurable. A resulting network of such devices can be considered an "ad-hoc" network, or alternatively a "piconet," or "personal area network." In this respect, some implementations provide that the computing devices 220, 228 and the self-propelled devices 224, 232, 236 can be considered nodes of the network, such as an ad-hoc network. In such configurations, network components, topology, and communications paths are flexible and can be readily adjusted to accommodate addition or removal of devices, changing communication requirements or channel interference. For example, the self-propelled device 238 in FIG. 2B is shown with no present network connection. However, the self-propelled device 238 has connected to the system 218 in the past and received instructions to enable it to operate without a persistent network link.

FIG. 2C is a schematic that illustrates a system 268 comprising a computing device and multiple self-propelled devices, under another embodiment. A computing device 240 is operable to communicate with one or more self-propelled devices 244, 250, 254. The computing device 240 may communicate commands or other control data, and receive feedback similar to embodiments described above. The self-propelled devices 244, 250, 254 are configured to communicate and/or be controlled by the computing device 240. Additionally, the self-propelled devices 244, 250, 254 are configured to communicate and/or control one another.

In the example shown by FIG. 2C, the computing device 240 communicates with self-propelled device 244 using communications link 242. Self-propelled device 244 communicates with self-propelled device 250 using link 246 and with self-propelled device 254 using link 248. Self-propelled devices 250 and 254 communicate using link 252. The computing device 250 can send data to self-propelled devices 250 or 254 using device 244 as a relay. Alternatively, the computing device 240 can communicate with the other self-propelled devices 250, 254 directly.

The system 268 may include various configurations. For example, a user may operate computing device 240 to control self-propelled device 244. Movement of the self-propelled device 244 may be communicated both to the computing device 240 and to one or more of the other self-propelled devices 250, 254. Each of the self-propelled devices may be preprogrammed to react in a specific manner based on state or position information communicated from another one of the self-propelled devices. For example, self-propelled devices 244, 250 may each be operated in a repel mode, so that the movement of self-propelled device 244 (as controlled from computing device 240) results in a repel motion by the self-propelled device 250. In other variations, self-propelled devices 244, 250, 254 may be preprogrammed to maintain a specific distance apart from one another, so that movement by one device automatically causes movement by the other two devices. Still further, the devices 244, 250, 254 may be configured so as to perform a variety of activities, such as, for example, (i) one self-propelled device automatically moving when another approaches a threshold distance; (ii) one self-propelled device programmatically moving to bump another self-propelled device; (iii) the self-propelled devices automatically moving in tandem based on input received by each of the self-propelled devices from the other self-propelled devices or from the computing device 240, and/or variations thereof.

The various systems 200, 218, 238 are illustrative of embodiments provided herein. With any of the systems described, variations include the addition of more or fewer computing devices, and/or more or fewer self-propelled devices. As described with some variations, additional sources or nodes can be provided from a remote network source.

Additionally, in some operational environments, the presence of the computing device is optional. For example, the self-propelled devices can be partially or completely autonomous, using programming logic to function.

Self-Propelled Device Examples

Figure 3A:
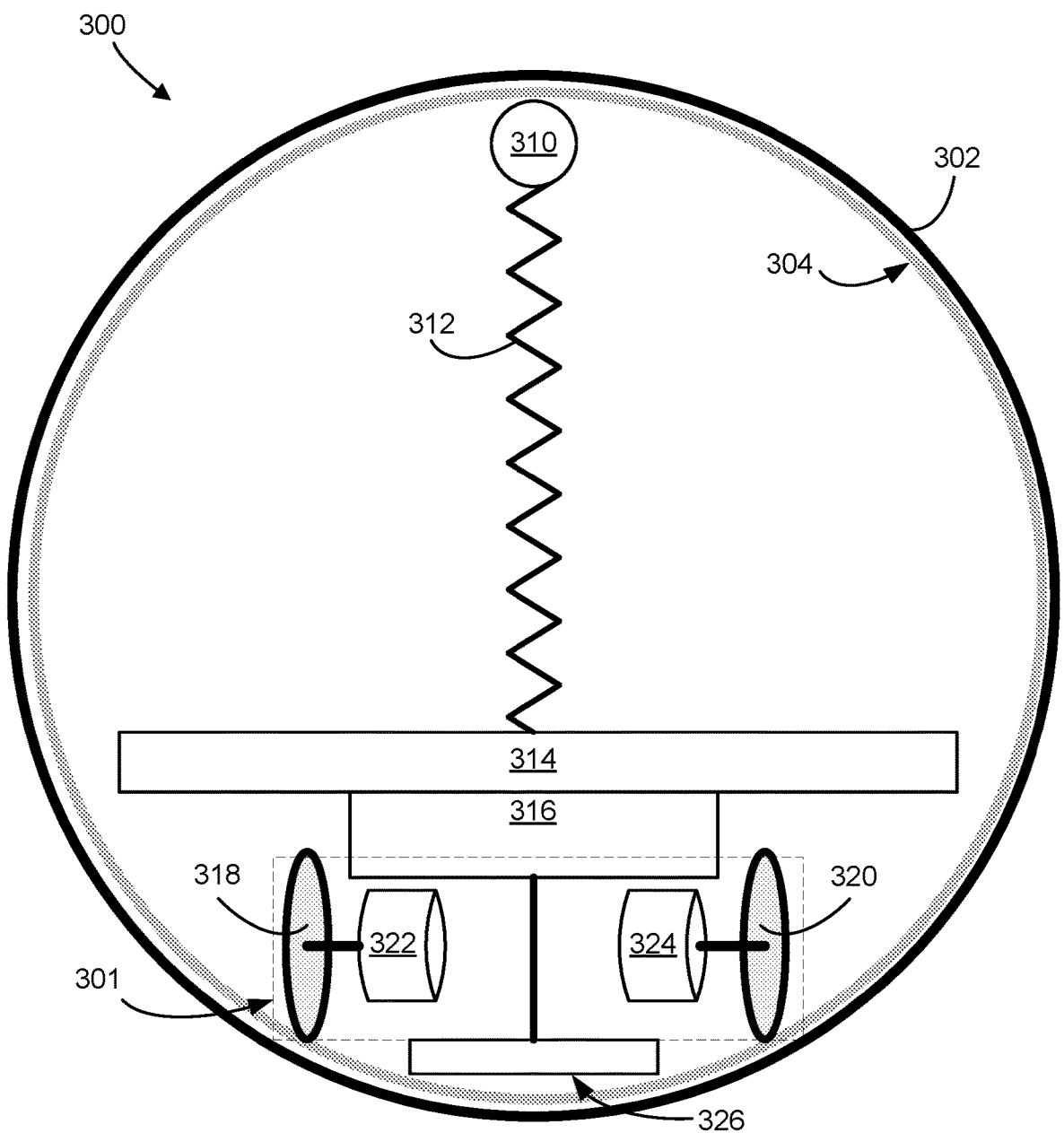
FIG. 3A is a block diagram illustrating the components of a self-propelled device that is in the form of a robotic, spherical ball, in accordance with an embodiment.

FIG. 3A is a block diagram illustrating the components of a self-propelled device 300 that is in the form of a robotic, spherical ball, in accordance with an embodiment. In one embodiment, the self-propelled device 300 is of a size and weight allowing it to be easily grasped, lifted, and carried in an adult human hand.

As shown, the self-propelled device 300 includes a spherical housing 302 with an outer surface that makes contact with an external surface as the device 300 rolls. In addition, the self-propelled device 300 includes an inner surface 304 of the housing 302. Additionally, the self-propelled device 300 includes several mechanical and electronic components enclosed by the housing 302.

In the described embodiment, the housing 302 is composed of a material that transmits signals used for wireless communication, yet is impervious to moisture and dirt. The housing material can be durable, washable, and/or shatter resistant. The housing 302 may also be structured to enable transmission of light and is textured to diffuse the light.

In one embodiment, the housing 302 is made of sealed polycarbonate plastic. In one embodiment, the housing 302 or the inner surface 304 is textured to diffuse light. In one embodiment, the housing 302 comprises two hemispherical shells with an associated attachment mechanism, such that the housing 302 can be opened to allow access to the internal electronic and mechanical components.

Several electronic and mechanical components are located inside the housing 302 for enabling processing, wireless communication, propulsion, and other functions. In an example, the components include a drive system 301 to enable the device 300 to propel itself. The drive system 301 can be coupled to processing resources and other control mechanisms, as described with other embodiments. Referring again to FIG. 3, a carrier 314 serves as the attachment point and support for the internal components of the self-propelled device 300. The components of the self-propelled device 300 are not rigidly attached to the housing 302. Instead, the drive system 310 is in frictional contact with the inner surface 304 at selected points, and is movable within the housing 302 by the action of actuators of the drive system 301.

The carrier 314 is in mechanical and electrical contact with energy storage 316. Energy storage 316 provides a reservoir of energy to power the device 300 and electronics and is replenished through inductive charge port 326. Energy storage 316, in one embodiment, is a rechargeable battery. In one embodiment, the energy storage 316 is a battery, such as one composed of lithium-polymer cells. In other embodiments, the energy storage 316 can be other types of rechargeable batteries.

The carrier 314 can provide the mounting location for most of the internal components, including printed circuit boards for electronic assemblies, sensor arrays, antennas, and connectors, as well as providing a mechanical attachment point for internal components.

In one embodiment, the drive system 301 includes motors 322, 324 and wheels 318, 320. The motors 322 and 324 connect to the wheels 318 and 320, respectively, each through an associated shaft, axle, and gear drive (not shown). The perimeter of the wheels 318 and 320 are two locations where the drive system 301 is in mechanical contact with the inner surface 304. The locations where the wheels 318 and 320 contact the inner surface 304 may be an essential part of the drive mechanism of the self-propelled device 300, and so the wheels 318 and 320 may be coated or covered with a material to increase friction and reduce slippage. For example, the wheels 318 and 320 may be covered with silicone rubber tires.

In some embodiments, a biasing mechanism is provided to actively force the wheels 318 and 320 against the inner surface 304. In an example, a spring 312 and a spring end 310 can comprise the biasing mechanism. More specifically, the spring 312 and the spring end 310 are positioned to contact the inner surface 304 at a point diametrically opposed to the wheels 318 and 320. The spring 312 and the spring end 310 provide additional contact force to reduce slippage of the wheels 318 and 320, particularly in situations where the drive system 301 is not positioned with the wheels 318 and 320 at the bottom and where gravity does not provide adequate force to prevent the drive wheels 318 and 320 from slipping. The spring 312 is selected to provide a force pushing the wheels 318 and 320 and the spring end 310 evenly against the inner surface 304.

The spring end 310 can be designed to provide near-frictionless contact with the inner surface 304. In one embodiment, the spring end 310 comprises a rounded surface configured to mirror a low-friction contact region at all of its contact points with the inner surface 304. Additional mechanisms of providing near-frictionless contact may be provided. In another implementation, the rounded surface may include one or more bearings to further reduce friction at the contact point where end 310 moves along inner surface 304.

Figure 3B:
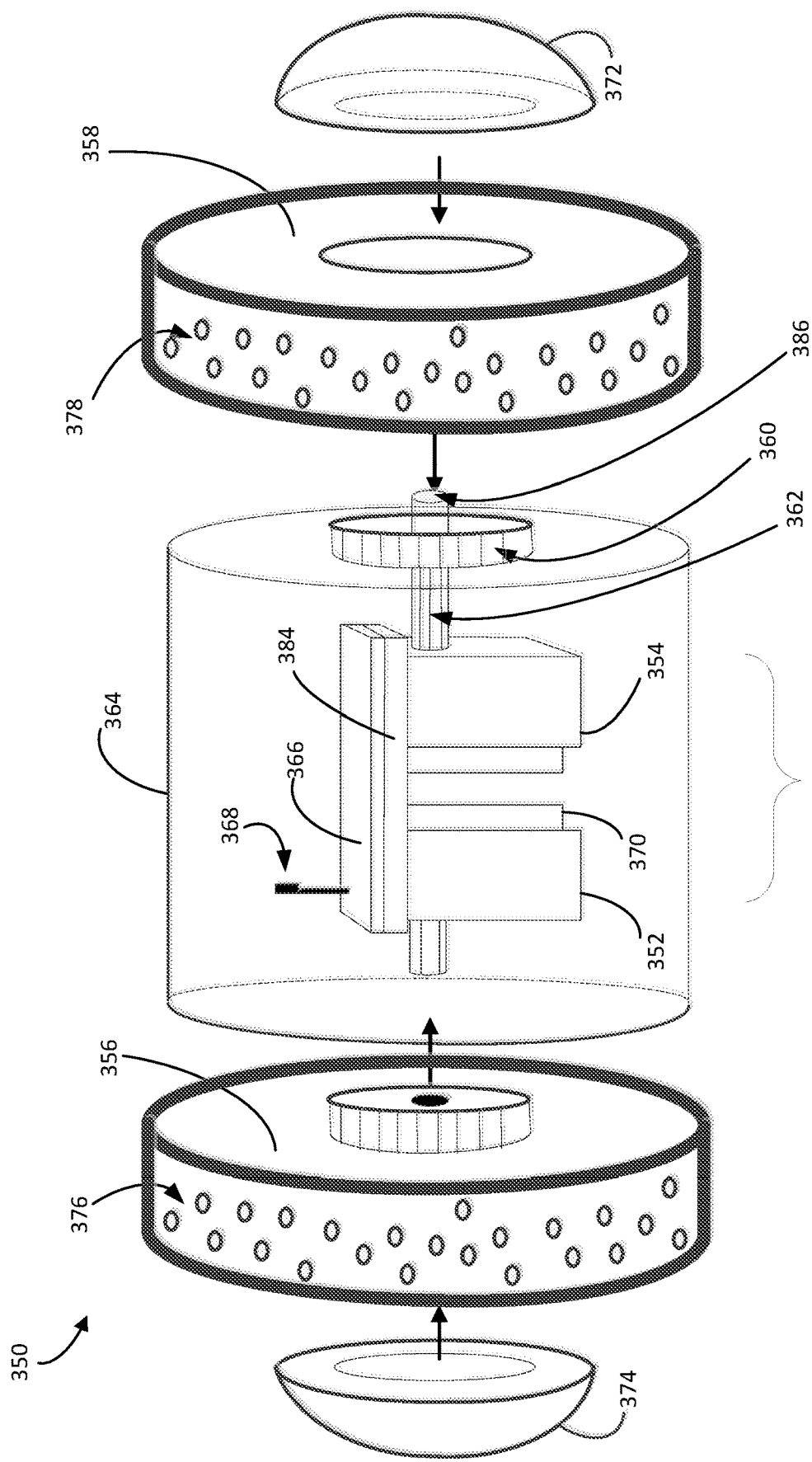
FIG. 3B is a block diagram illustrating an exploded view of an example self-propelled device.

FIG. 3B is a block diagram illustrating an exploded view of an example of a cylindrical self-propelled device 350. In an example of FIG. 3B, a drive system 305 includes a left motor 352 and a right motor 354 with respective axles, one or more power units 370, a carrier 384, a circuit board 366 with any number of electronic components, and a receiver 368 which can be configured or included as any variety of wireless communication standards and/or technologies.

Referring to FIG. 3B, the above features are included within a body 364 of the self-propelled device 350. Furthermore, any combination of the above features can be configured to be rigid to the body 364. For example, the carrier 384 can be mounted or otherwise attached to an inner portion of the body 364. Alternatively, any number of interior components of the self-propelled device 350 can be coupled to the inner portion of the body 364. Accordingly, due to the interior components being rigid to the body 364, the body 364 can rotate in conjunction with the rotational pitch of the drive system 305 when the self-propelled device 350 is being maneuvered.

The body 364 is substantially cylindrical in shape and can include any number of designs and features. For example, the body can be at least partially transparent such that light from an internal light emitting component disposed within the body is apparent from outside of the device 350. The internal light emitting component can be any type of illuminating element, such as one or more light-emitting diodes (LEDs) or one or more LED arrays. The illuminating element can be affixed to the carrier 384, or any other interior component of the self-propelled device 350. As an addition or alternative, the body 364 can be comprised of sealed polycarbonate plastic or other composite that can be textured to diffuse light from the internal illuminating element.

Furthermore, the body 364 may be composed of a material that allows for transmission of signals used for wireless communication. Still further, an outer surface of the body 364 can be comprised of a material that is substantially impervious to moisture and every day wear and tear. The body 364 can be detachable from the self-propelled device 350 to allow for access to the interior components, and may further be durable, washable, and/or shatter resistant.

As an addition or alternative, the body 364 can include fastening or attachment points to allow for removable accessories to be attached to the exterior of the body 364. As discussed in further detail below, these accessories may include, for example, an attachable head lamp or a trailer attachment.

As shown in FIG. 3B for illustrative purposes, the gear 360 for a particular wheel 358 can be molded or formed at least partially within an interior portion of a wheel, such as illustrated by wheel 358. Alternatively, the gear 360 can be included as a portion of a power train in which the motor 354 is coupled to an axle 362 and gear 360 combination.

Accordingly, the axle 362 and gear 360 combination may then be fitted to the wheel 358. Alternatively, an axle and gear combination can be formed at least partially within an interior portion of a wheel.

Still further, a wheel hub 386 can be (i) formed at least partially within an outer portion of a respective wheel (not shown), (ii) formed in combination with a gear within an inner radius of a wheel (also not shown), or (iii) part of the power train attached to the gear 360 and axle 362. In the latter example, the wheel hub 386 can be a part of or coupled to the axle 362, and can further be configured to protrude from the outer portion of the wheel 358. The self-propelled device 350 can further incorporate removable hub covers 372, 374 that can be readily attached and detached from the wheel hubs 386. The hub covers 372, 374 may come in a variety of different colors and/or styles accordingly to a user's preference. Alternatively, the hub covers 372, 374 can be affixed semi-permanently to the wheel hubs 386. The hub covers 372, 374 may be made from a hard or soft plastic, plastic/rubber composite or compound, metal, or any other suitable material.

The wheels 356, 358 can allow for wheel coverings 376, 378 (e.g., tires) to be fitted over them. The wheel coverings 376, 378 can be removable and be formed of a soft rubber compound. However, the wheel coverings 376, 378 are not limited to soft rubber, and may be made of any compound. The wheel coverings 376, 378 may include any number of tread patterns for specialized or simply stylistic purposes. The wheel coverings 376, 378 can also come in a variety of different styles and/or colors according to a user's preference. In variations, the wheels 356, 358 have the same or substantially the same height as the body 364, and the wheel coverings 376, 378 can allow for a slight height advantage of the wheel and tire combination with respect to the body. Alternatively, the wheels 356, 358 can be significantly larger in height than the body 364.

Self-Propelled Device with Magnetic Coupling

Figure 4A:
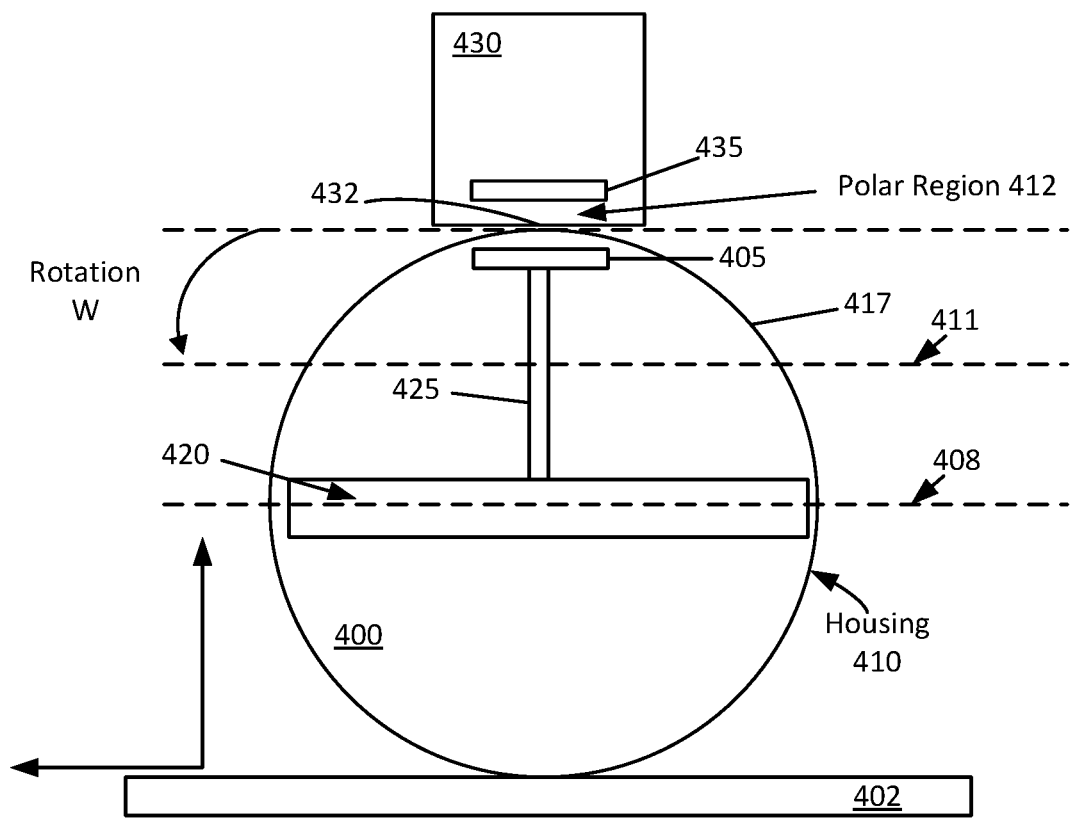
FIGS. 4A-4D illustrate an example of a spinning or rolling self-propelled device that includes components for magnetically coupling with an external accessory device, according to some embodiments.
Figure 4B:
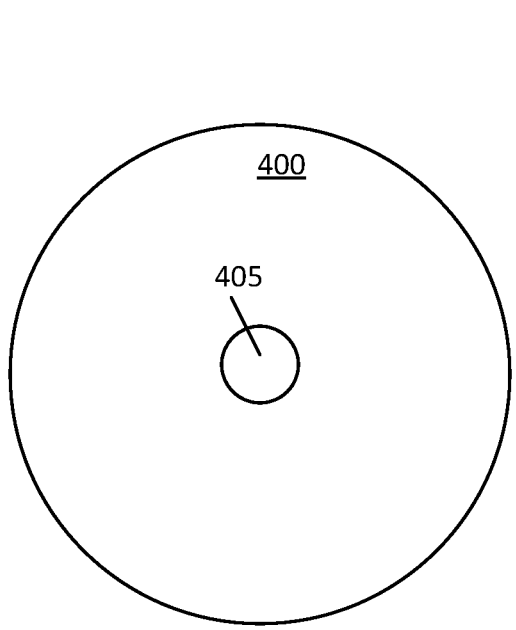
Figure 4C:
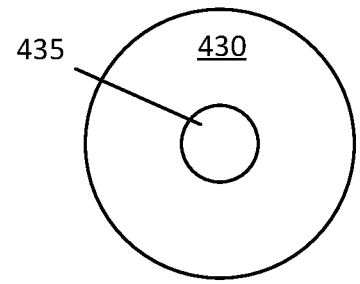
Figure 4D:
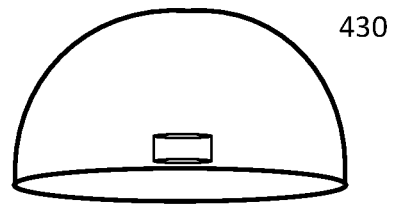

FIGS. 4A-4D illustrate an example of a spinning or rolling self-propelled device that includes components for magnetically coupling with an external accessory device, according to some embodiments. In an example of FIG. 4A, a self-propelled device 400 is depicted as being in motion, while magnetically coupled to an external accessory device 430. FIG. 4B illustrates a top view of the self-propelled device 400, depicting a magnetic element 405 for creating a magnetic coupling. Likewise, FIG. 4C illustrates a top view of the external accessory device, depicting a complementary magnetic element 435 for coupling with the magnetic element 405 of the self-propelled device 400.

In an example of FIGS. 4A-4D, the self-propelled device 400 is structured in accordance with an implementation such as described with an example of FIG. 3A (e.g., self-propelled device 300), or with an example of FIG. 3B (e.g., self-propelled device 350). Accordingly, in an example of FIGS. 4A-4D, self-propelled device 400 includes a spherical housing 410 which rolls on an underlying surface 402 using an internal drive system. In variations, the housing 410 of the self-propelled device 400 can have an alternative rounded shape, such as an elliptical or cylindrical (e.g., with reference to FIG. 3B) shape, so that the housing spins above or on the underlying surface 402.

According to one aspect, the self-propelled device 400 can include magnetic element 405 formed from a magnetic material, and an internal support structure 425 to support the magnetic element 405 in a desired orientation and position with respect to the underlying surface 402. By way of example, the support structure 425 can be implemented as part of a biasing mechanism, and the magnetic element 405 can be provided on a tip or spring end of the biasing mechanism. The magnetic element 405 can correspond to a magnet, or to any material (e.g., ferrous metals etc.) which is able to magnetically interact and couple with complementary magnets provided on the external accessory device 430. A board structure 420 (e.g., printed circuit board) can provide logic and hardware for controlling the drive system of the self-propelled device 400. In one implementation, the board structure 420 and the support structure 425 are provided as part of a platform which maintains a substantially constant angular position with rotation (W) of the housing 410 on the underlying surface 402.

The accessory device 430 can include a complementary magnetic element 435 on or near a bottom region which makes contact with the spherical housing 410. In variations, the accessory device 430 can include a variety of shapes and orientations, depending on the implementation or purpose of the combined device. For example, in an implementation of FIGS. 4A-4C, the accessory device 430 includes a cylindrical or rectangular "hat" shape for the spherical housing 410. In other variations, the accessory device 430 can have a sphere or ball shape. In many applications, the self-propelled device 400 operates as a toy or device for amusement, and the accessory device 430 is selectively shaped or structured to imitate human characteristics, or to provide other enhancements for furthering the amusement and appreciation of the combined device.

In one implementation, the magnetic elements 405, 435 of each of the self-propelled device 400 and the accessory device 430 are magnets oriented such that their opposing poles are directed towards each other to enable magnetic attraction. In variations, the magnetic elements 405, 435 of the self-propelled device 400 or the accessory device 430 include magnetically interactive materials, such as ferrous metals.

In various examples, an operational or use environment of the self-propelled device 400 can include events or conditions which disrupt the motion of the self-propelled device 400, such as (i) variations in the underlying surfaces (e.g., transition from smooth flooring to carpet flooring), (ii) collisions (e.g., with walls or other self-propelled devices), and (iii) relatively sharp velocity and acceleration of the self-propelled device 400, due to the self-propelled device 400 spinning or turning in any one of a variety of directions. Given the operational and use environment of the self-propelled device 400, the magnetic elements 405, 435 can maintain a strong, stable, and resilient magnetic coupling between the self-propelled device 400 and the accessory device 430.

Accordingly, in some embodiments, the quantity and/or distribution of magnetic elements (or magnetic material) within the spherical housing 410 can be varied to increase stability and/or resiliency of the magnetic coupling. For example, while an example of FIG. 4A provides for the magnetic element 405 to be positioned substantially in a polar region 412 (relative to the underlying surface 402), in variations, the magnetic element 405 can be replaced or augmented with multiple discrete magnetic elements that are positioned to promote strength, stability, or resiliency in the magnetic coupling. For example, discrete magnetic elements can be positioned equidistantly (or otherwise) from the polar region 412, such as along a latitudinal plane 411 between the equator 408 and the polar region 412. The accessory device 430 can include one or more complementary magnetic elements 435 to enable the desired magnetic coupling.

Still further, a coupling surface of the accessory device 430 can include contours and features to reduce friction, at least when the self-propelled device 400 is in motion. The presence of friction can, for example, cause the spherical housing 410 and accessory device 430 to magnetically detach or destabilize the coupling between the two devices. To reduce friction, a bottom surface 432 of the accessory device 430 can be rounded, and an exterior surface of each of the spherical housing 410 and the accessory device 430 can be maintained relatively smooth. Additionally, one or both of the exterior surface 417 of the spherical housing 410 and the bottom surface 432 of the accessory device 430 can be formed from a material that reduces friction with other surfaces.

The accessory device 430 may exhibit a variety of differing shapes in a variety of different sizes. For example, referring to FIG. 4D, the accessory device 430 may be dome-shaped or hemispherical. The accessory device 430 may further be shaped as a disc, a cuboid, a cylinder, or any number of other irregular shapes. Regardless of the shape or size, the accessory device 430 can include a number of magnets 435 to remain under magnetic interaction with the magnetic element 405 of the self-propelled device 400. Furthermore, the accessory device 430 may be interchangeable with various other accessory devices of differing shapes and sizes.

FIG. 5A and FIG. 5B illustrate a self-propelled device in motion while magnetically coupled to an accessory device, according to one or more embodiments. When the self-propelled device 500 moves, an external accessory device 504 can remain magnetically coupled to the self-propelled device 500 at a substantially constant position on top of the self-propelled device 500. As such, while the self-propelled device 500 is being maneuvered, a support platform or structure 515 (e.g., such as one that provides the biasing mechanism 615 of FIG. 6 as described in detail below) may have a variable tilt angle (polar angle ($\theta$) relative to the plane of motion) that does not typically exceed 45 degrees when an extreme disruptive event or condition occurs. However, during continuous and stable maneuvering of the self-propelled device 500, the tilt of the support platform or structure 515 may be minimal, such as within 10 degrees about the horizontal. Furthermore, during maneuvering, the azimuth ($\varphi$) can vary at any angle depending on independent power transferred from motors or wheels or another drive mechanism of the self-propelled device.

To achieve continuous motion at a constant velocity for the self-propelled device 500, the displacement of the device's center of mass relative to its center of rotation can be maintained by action of wheels 568, 570. The displacement of the center of mass of the self-propelled device 500 relative to a center of rotation can be difficult to measure, and thus it can be difficult to obtain feedback for a closed-loop controller to maintain constant velocity. However, the displacement is proportional to the tilt angle (equal to polar angle $\theta$) between support platform or the structure 515 and the surface on which self-propelled device 500 moves. The tilt angle can be sensed or estimated from a variety of sensor inputs. Therefore, as an example, a speed controller for the self-propelled device 500 can be implemented to use the tilt angle between the support platform or structure 515 and the surface to regulate speed for the wheels 568, 570 causing the self-propelled device 500 to move at a constant speed. The speed controller can determine the desired tilt angle to produce the desired speed, and the desired angle set-point is provided as an input to a closed loop controller regulating the drive mechanism.

In some implementations, such as illustrated by FIG. 5B, the self-propelled device 500 can be under operative control by a controller device 502. The controller device 502 can be any device capable of communicatively linking with the self-propelled device 500 to provide control commands. For example, the controller device 502 can be a multifunctional wireless device, such as a smart phone or tablet computing device. The controller device 502 can execute an application specific to controlling the self-propelled device 500. In accordance with many examples, the controller device 502 can generate a user interface including virtual controls (e.g., a virtual steering mechanism) to enable a user to operate the self-propelled device. Thus, as shown in FIG. 5B, as the user inputs a control input 590 commanding the self-propelled device 500 to move forward on the controller device 502, the self-propelled device 500 moves forward accordingly.

In an example of FIG. 5A and FIG. 5B, the internal drive system of the self-propelled device 500 can generate momentum to pitch or tilt the platform based on the direction of acceleration, which can coincide with forward, reverse, or lateral acceleration. The magnetic interaction between external accessory 504 and the self-propelled device 500 can cause the external accessory 504 to roll or pitch along with the internal components as the self-propelled device 500 accelerates and drives forward. In order to prevent the external accessory 504 from spinning, the external accessory 504 can have complementary magnetic elements oriented with opposing polarity to the magnetic elements of the self-propelled device 500. In the examples shown in FIGS. 5A-5B, the self-propelled device 500 includes a pair of magnetic elements, where a first magnetic element may be oriented such that its south magnetic pole faces upwards, and a second magnetic element may be oriented such that its north magnetic pole faces upwards. Thus, the external accessory 504 can include a complementary pair of magnets with a first magnetic element being oriented with its south magnetic pole facing downwards to magnetically attract the first magnetic element of the self-propelled device 500. A second magnetic element of the external accessory 504 can be oriented with its north magnetic pole facing downward to magnetically attract the second magnetic element of the self-propelled device 500. Various magnetic element arrangements are contemplated in which any number of magnetic elements (e.g., a magnetic array) can be included in the self-propelled device 500. For such arrangement, example external accessory devices 504 can include a complementary set or magnetic array with partnered magnets oriented in opposition to their associated magnets within the self-propelled device 500.

Figure 6:
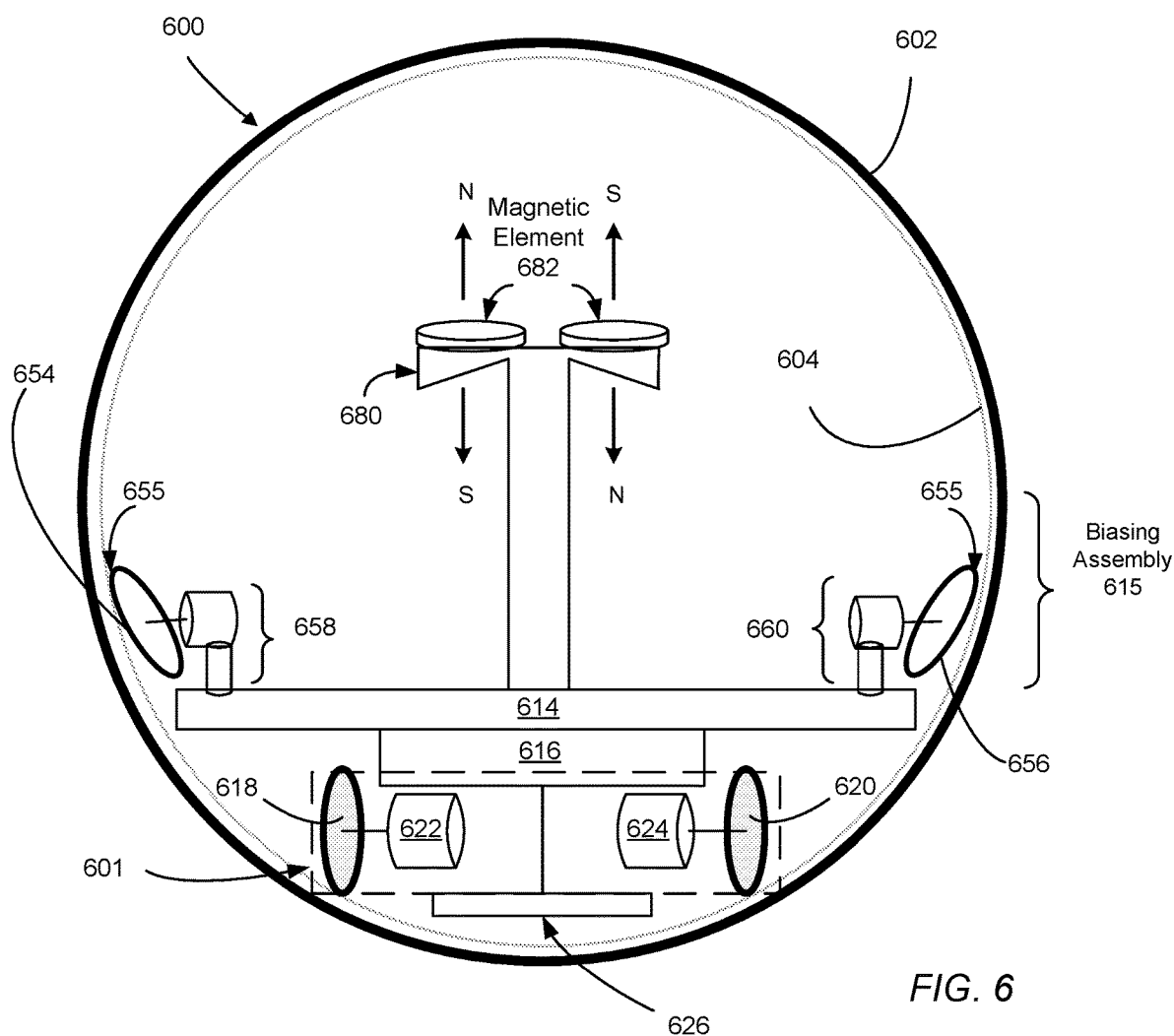
FIG. 6 illustrates an example of a spherical self-propelled device, and shows a schematic illustrating the components of the example spherical self-propelled device.

FIG. 6 illustrates an example of a spherical self-propelled device 600, and shows a schematic illustrating the components of the example spherical self-propelled device 600. However, variations of the present disclosure are not limited to such devices. Rather, the above-discussed system 100 of FIG. 1 can be implemented with respect to any remote device in which pairings or connections are made. Referring to FIG. 6, the self-propelled device 600 can be of a size and weight allowing it to be easily grasped, lifted, and carried in an adult human hand. The self-propelled device 600 can include a spherical housing 602 with an outer surface that makes contact with an external surface of a corresponding magnetically coupled accessory device as the self-propelled device 600 rolls. In addition, the spherical housing 602 includes an inner surface 604. Additionally, the self-propelled device 600 includes several mechanical and electronic components enclosed by the spherical housing 602. In an example, self-propelled device 600 includes magnetic elements 682 which are supported within spherical housing 602 and which magnetically interact with complementary magnetic elements of a suitable accessory device. The magnetic interaction and coupling can occur and/or be maintained while the self-propelled device 600 moves.

The spherical housing 602 can be composed of a material that transmits signals used for wireless communication, yet is impervious to moisture and dirt. The spherical housing 602 can comprise a material that is durable, washable, and/or shatter-resistant. The spherical housing 602 may also be structured to enable transmission of light and can be textured to diffuse the light.

In one variation, the housing 602 is made of sealed polycarbonate plastic. In one example, the spherical housing 602 comprises two hemispherical shells with an associated attachment mechanism, such that the spherical housing 602 can be opened to allow access to the internal electronic and mechanical components.

Several electronic and mechanical components are located inside the envelope for enabling processing, wireless communication, propulsion and other functions (collectively referred to as the "interior mechanism"). In an example, the components include a drive system 601 to enable the device to propel itself. The drive system 601 can be coupled to processing resources and other control mechanisms, as described with other examples. The carrier 614 serves as the attachment point and support for components of the drive system 601. The components of the drive system 601 are not rigidly attached to the spherical housing 602. Instead, the drive system 601 can include a pair of wheels 618, 620 that are in frictional contact with the inner surface 604 of the spherical housing 602.

The carrier 614 is in mechanical and electrical contact with an energy storage 616. The energy storage 616 provides a reservoir of energy to power the device 600 and electronics and can be replenished through an inductive charge port 626. The energy storage 616, in one example, is a rechargeable battery. In one variation, the battery is composed of lithium-polymer cells. In other variations, other rechargeable battery chemistries are used.

The carrier 614 can provide the mounting location for most of the internal components, including printed circuit boards for electronic assemblies, sensor arrays, antennas, and connectors, as well as providing a mechanical attachment point for internal components.

The drive system 601 can include motors 622, 624 and wheels 618, 620. The motors 622 and 624 connect to the wheels 618 and 620, respectively, each through an associated shaft, axle, and gear drive (not shown). The perimeter of wheels 618 and 620 are two locations where the interior mechanism is in mechanical contact with the inner surface 604. The locations where the wheels 618 and 620 contact the inner surface 604 are an essential part of the drive mechanism of the self-propelled device 600, and so are preferably coated or covered with a material to increase friction and reduce slippage. For example, the wheels 618 and 620 can be covered with silicone rubber tires.

In some variations, a biasing assembly 615 is provided to actively force the wheels 618, 620 against the inner surface 604. In an example illustrated by FIG. 6, the biasing assembly 615 can comprise two or more separate portal axles 658, 660 to actively force the drive system wheels 618, 620 against the inner surface 604. The portal axles 658, 660 may include biasing elements 654, 656 (or springs) which include tips 655 or ends that press against the inner surface 604 with a force vector having a vertical value. The vertical force from the bias springs 654, 656 pressing against the inner surface 604 actively forces the drive system 601 and its respective wheels 618, 620 against the inner surface 604, thereby providing sufficient force for the drive system 601 to cause the self-propelled device 600 to move.

The portal axles 658, 660 comprising the independent biasing elements 654, 656 can be mounted directly onto the carrier 614. The biasing elements 654, 656 coupled to the portal axles 658, 660 may be in the form of torsion springs which instigate a force against the inner surface 604. As an addition or alternative, the biasing elements 654, 656 may be comprised of one or more of a compression spring, a clock spring, or a tension spring. Alternatively, the portal axles 658, 660 can be mounted, without inclusion of springs, to maintain a force pressing the drive system 601 and wheels 618, 620 against the inner surface 604, and allow sufficient traction to cause the self-propelled device 600 to move.

According to many examples, the self-propelled device 600 can include an inductive charge port 626 to enable inductive charging of a power source 616 used to provide power to the independent motors 622, 624 that power the wheels 618, 620. The self-propelled device 600 can further include a magnet holder 680 coupled to the carrier 614. The magnet holder 680 can include a set of magnetically interactive elements 682, such as elements comprised of ferrous materials, and/or electromagnets or permanent magnets. Likewise, an external accessory can also include complementary magnets for enabling the magnetic coupling. Thus, the magnet holder 680 and the external accessory can comprise one or more of any combination of magnetically interactive metals, ferromagnetic elements, neodymium, yttrium/cobalt, alnico, or other permanent elemental magnets, other "rare-earth" magnets, electromagnets, etc.

In variations, the magnet holder 680 can include a set of magnetic elements 682 (e.g., a magnet pair) which can be oriented to have opposing polarity. For example, as shown with other examples, the magnetic elements 682 include a first magnet and a second magnet, where the first magnet can be oriented such that its north magnetic pole faces upwards and its south magnetic pole faces downwards. The second magnet can be oriented such that its south magnetic pole faces upwards and its north magnetic pole face downwards.

In variations, the magnet holder 680 and an external accessory can each house any number or combination of complementary magnets or magnetic components. For example, a single magnetic component may be housed in either the self-propelled device 600 or in a corresponding external accessory, and be arranged to magnetically interact with a plurality of magnetic components of the other of the external accessory or the self-propelled device 600. Alternatively, for larger variations, magnetic arrays of three or more magnets may be housed within the spherical housing 602 to magnetically interact with a corresponding magnetic array of the external accessory.

In some examples, the biasing assembly 615 is formed such that the wheels 618, 620 and the tip ends 655 of the biasing elements 654, 656 are almost constantly engaged with the inner surface 604 of the spherical housing 602. As such, much of the power from the motors 622, 624 is transferred directly to rotating the spherical housing 602, as opposed to causing the internal components (i.e., the biasing assembly 615 and internal drive system 601) to pitch. Thus, while motion of the self-propelled device 600 may be caused, at least partially, by pitching the internal components (and therefore the center of mass), motion may also be directly caused by active force of the wheels 618, 620 against the inner surface 604 of the spherical housing 602 (via the biasing assembly 615) and direct transfer of electrical power from the motors 622, 624 to the wheels 618, 620. As such, the pitch of the biasing assembly 615 may be substantially reduced, and remain substantially constant (e.g., substantially perpendicular to the external surface on which the self-propelled device 600 moves). Additionally or as an alternative, the pitch of the biasing assembly 615 may increase (e.g., to over 45 degrees) during periods of hard acceleration or deceleration. Furthermore, under normal operating conditions, the pitch of the biasing assembly 615 can remain stable or subtly vary (e.g., within 10-15 degrees).

In some variations, the magnetic elements 682 can be replaced or augmented with magnetic material, which can be included on, for example, the tip ends 655 of the biasing elements 654, 656. The tip ends 655 can be formed of a magnetic material, such as a ferrous metal. Such metals can include iron, nickel, cobalt, gadolinium, neodymium, samarium, or metal alloys containing proportions of these metals. Alternatively, the tip ends 655 can include a substantially frictionless contact portion, in contact with the inner surface 604 of the spherical housing 602, and a magnetically interactive portion, comprised of the above-referenced metals or metal alloys, in contact or non-contact with the inner surface 604. As another variation, the substantially frictionless contact portion can be comprised of an organic polymer such as a thermoplastic or thermosetting polymer.

In some examples, the tip ends 655 can be formed of magnets, such as polished neodymium permanent magnets. In such variations, the tip ends 655 can produce a magnetic field extending beyond the outer surface of the spherical housing 602 to magnetically couple with the external accessory device. Alternatively still, the tip ends 655 can include a substantially frictionless contact portion, and have a magnet included therein.

Alternatively still, a magnetic component of the self-propelled device 600 may be included on any internal component, such as the carrier 614, or an additional component coupled to the biasing assembly 615 or the carrier 614.

In further examples, one or more of the magnetic elements 682, the tip ends 655, and/or the complementary magnets of the external accessory device can comprise any number of electro- or permanent magnets. Such magnets may be irregular in shape to provide added magnetic stability upon motion of the self-propelled device 600. For example, the magnetic elements 682 of the self-propelled device 600 can be a single or multiple magnetic strips including one or more tributary strips to couple with the complementary magnet(s) of the accessory device. Additionally, or alternatively, the tip ends 655 can also include a single or multiple magnets of different shapes which couple to complementary magnets of the accessory device.

Alternatively, the magnetic coupling between the self-propelled device 600 and the accessory device can be one which creates a stable magnetically repulsive state. For example, the magnetic elements 682 can include a superconductor material to substantially eliminate dynamic instability of a repelling magnetic force in order to allow for stable magnetic levitation of the accessory device in relation to the magnetic elements 682 while the spherical housing 602 rotates on the underlying surface. In similar variations, a diamagnetic material may be included in one or more of the self-propelled device 600, the tip ends 655, or the external accessory device, to provide stability for magnetic levitation. Thus, without the use of guiderails or a magnetic track, the self-propelled device 600 may be caused to maneuver in any direction with the external accessory device remaining in a substantially constant position along a vertical axis of the self-propelled device 600 (Cartesian or cylindrical z-axis, or spherical r-coordinate with no polar angle ($\theta$)).

Figure 7A:
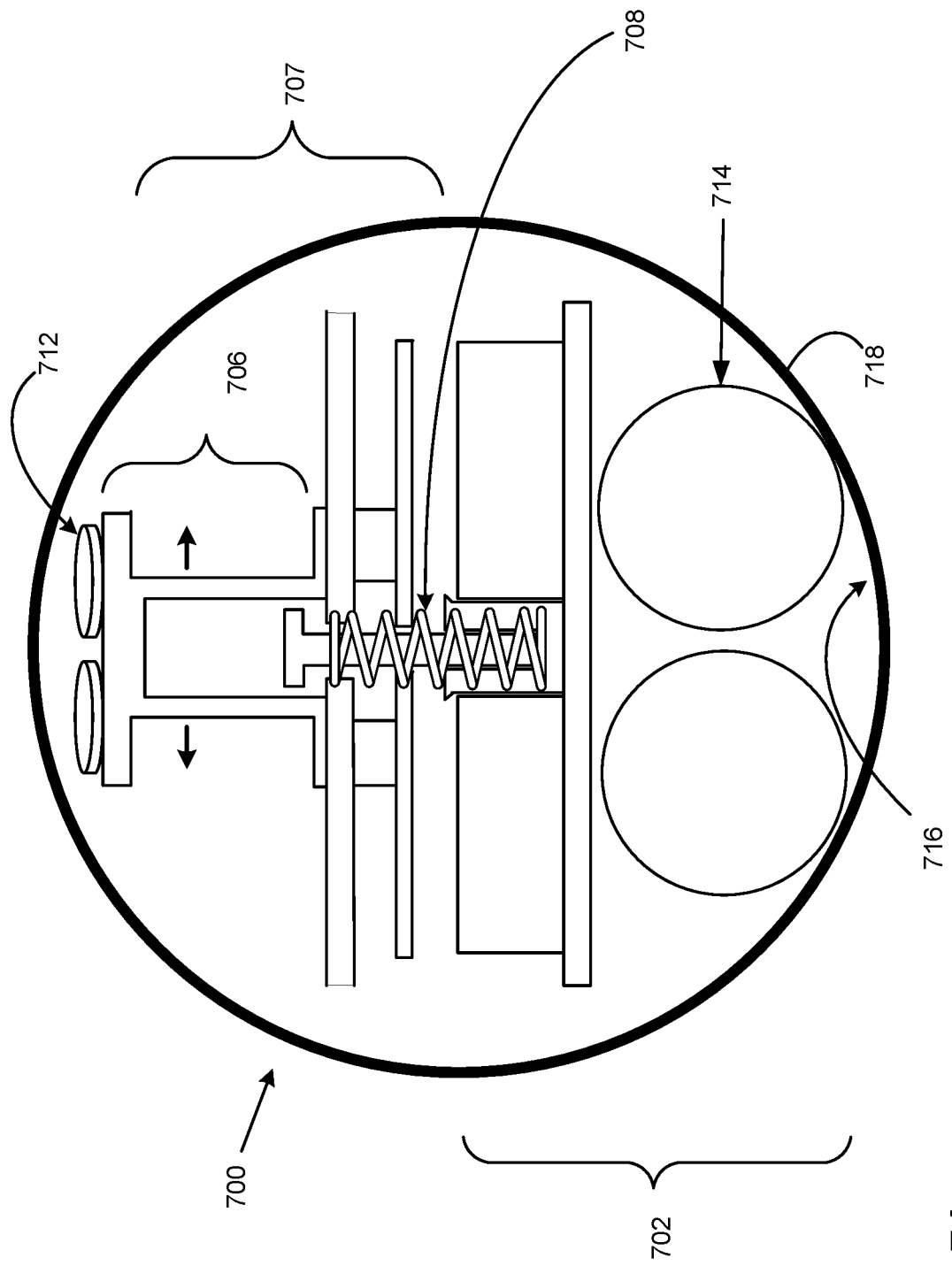
FIG. 7A is a cross-sectional side view of an example self-propelled device including an independent internal structure and a structure for magnetic coupling to an accessory device.

FIG. 7A is a cross-sectional side view of an example self-propelled device including an independent internal structure and a structure for magnetic coupling to an external accessory device. In the below description of FIG. 7A, the self-propelled device 700 may incorporate numerous features of other examples provided herein. Referring to FIG. 7A, the self-propelled device 700 can include an internal drive system 702 to cause the self-propelled device 700 to move in any one of multiple possible directions. The internal drive system 702 can be biased, by one or more biasing elements, in order to cause a number of wheels 714 to continuously engage the inner surface 716 of the spherical housing 718. Thus, as the self-propelled device 700 is remotely operated by a controller device, the internal drive system 702 causes the spherical housing 718 to roll and maneuver in accordance with received control commands.

According to examples described herein, the self-propelled device 700 can include an external accessory, where magnetic elements 712 of the self-propelled device 700 can magnetically interact through the spherical housing 718 with corresponding magnetic elements or material of the external accessory. Accordingly, as the spherical housing 718 rolls, the magnetic interaction between the magnetic elements 712 and the corresponding magnetic elements or material of the external accessory causes the magnet holder 706, upon which the magnetic elements of the self-propelled device 700 are housed, to maintain a positional relationship with the external accessory. Thus, the spherical housing 718 may roll and maneuver based on received control commands, and the magnetic elements 712 may maintain continuous interaction with the magnetic elements or material of the external accessory device.

In some examples, the magnet holder 706 can be directly coupled to the internal drive system 702, or a carrier on which components such as a circuit board are integrated. Alternatively, the magnet holder 706 can be coupled to an independent internal structure 707 that is coupled to the internal drive system via a tilt spring 708. As shown in FIG. 7A, the tilt spring 708 can allow for an amount of shock absorption when the self-propelled device 700 experiences a collision event. The tilt spring 708 can further dampen an impact force experienced by the independent internal structure 707, in order to lessen jolts, jerk events, and/or jounces experienced by the self-propelled device 700. Such events may increase the probability that the magnetic elements will decouple, causing the external accessory coupled to the self-propelled device 700 to detach. The tilt spring 708 can decrease the probability of such decoupling events.

Figure 7B:
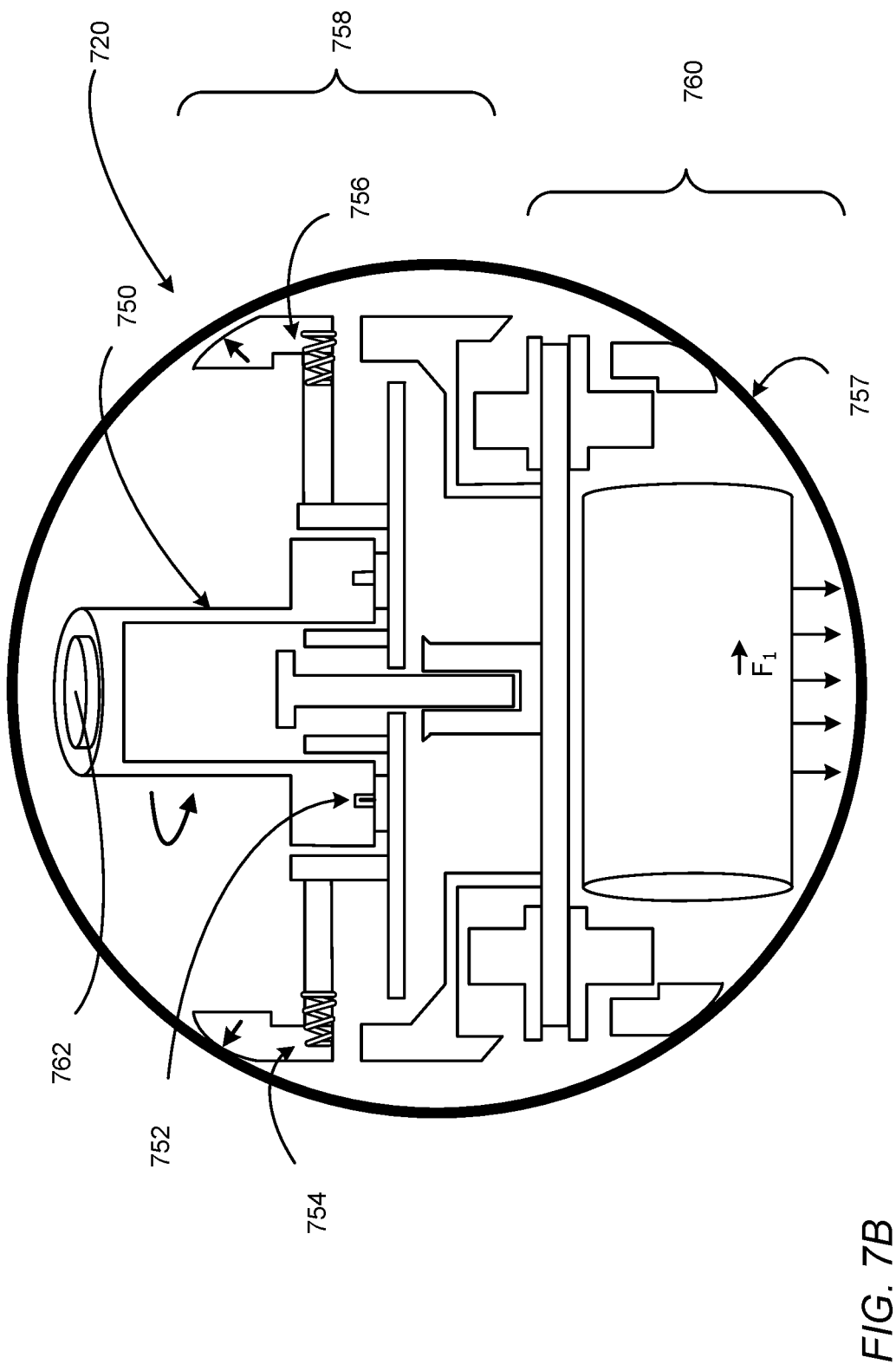
FIG. 7B is a cross-sectional front view of an example self-propelled device including a biasing assembly and a structure for magnetic coupling to an accessory device.

FIG. 7B is a cross-sectional front view of an example self-propelled device including a biasing assembly and a structure for magnetic coupling to an accessory device. The self-propelled device 720 may be a variant of the self-propelled device 700 as described with respect to FIG. 7A. As an example, the independent internal structure 707 of FIG. 7A may be included as part of a biasing assembly 758 as shown in FIG. 7B. Furthermore, while not shown in FIG. 7B, the self-propelled device 720 may also include a tilt spring 708 as provided in FIG. 7A. Referring to FIG. 7B, the internal drive system 760 of the self-propelled device 720 can be biased by the biasing assembly 758. The biasing assembly 758 can include a number of biasing elements 754, 756, which can include springs, or other devices storing mechanical energy, in order to produce a continuous force on the inner surface of the spherical housing 757. The force provided by the biasing elements 754, 756 can cause the internal drive system 760 to exert a continuous force ($F_1$) on the inner surface of the spherical housing 757 so that when power is provided to wheels within device 720, the turning wheels cause the self-propelled device 720 to roll and maneuver.

Any number of biasing elements 754, 756 may be included within the spherical housing 757. Such biasing elements 754, 756 may be included on the biasing assembly 758, and also as part of the internal drive system 760 to provide stability and decrease the pitch and/or roll of the internal components of the self-propelled device 720 during operation. A reduction in the tilting of the internal components of self-propelled device 720 can cause the external accessory to maintain contact with the spherical housing 757 within a tighter positional area on a top portion of the self-propelled device 720 as the self-propelled device 720 moves.

According to examples, the biasing assembly 758 can include a pivoting magnet holder 750, which can pivot a number of degrees (e.g., 10-20), or which can be set on a guide system to pivot a full 360 degrees. The pivoting magnet holder 750 can include a pair of magnets 762 oriented with opposing polarity to each other. Complementary magnets of a corresponding external accessory can also be oriented with opposing polarity to each other, such that the external accessory can only be attached to the self-propelled device 720 and the opposing magnets on the external accessory couple to the opposing magnets 762 on the pivoting magnet holder 750. Accordingly, as the pivoting magnet holder 750 pivots, the external accessory pivots accordingly.

The biasing assembly 758 can further include a pivot actuator 752 which, based on a control command received from a controller device, can cause the pivoting magnet holder 750 to turn. In an example where the device of FIG. 7B is implemented with the system 100 of FIG. 1, a pivot command can be received via a transducer 102 and processed by a processor 114 (as shown in FIG. 1) in order to implement the command on the pivot actuator 752. Thus, a control feature on the controller device, such as a user interface feature on a virtual steering mechanism, can be used to receive user input which causes the pivoting magnet holder 750 to turn, and thereby causes the external accessory to turn. The pivot actuator 752 can be controlled to turn clockwise or counterclockwise dynamically in response to such pivot commands.

Additionally or alternatively, the self-propelled device 720 may be preprogrammed to cause the pivot actuator 752 to activate in response to certain events. For example, upon starting up, the self-propelled device 720 may be preprogrammed to detect a direction towards the controller device. Based on the direction of the controller, the internal drive system 760 can rotate the self-propelled device 720 in order calibrate a forward direction for the self-propelled device 720 in relation to the controller device. In addition, the pivot actuator 752 may be automatically enabled to turn the pivoting magnet holder 750 such that the external accessory faces the controller device.

Additionally or alternatively, the pivoting magnet holder 750 may have a default forward direction that coincides with a calibrated forward direction of the internal drive system 760. Thus, as the self-propelled device 720 is initially calibrated to the controls of the controller device, the pivot actuator 752 may be enabled to automatically calibrate a forward facing direction for the external accessory. Furthermore, the pivot actuator 752 may be automatically initiated during collision events or when another self-propelled device is detected within a predetermined distance. Further still, combinations of actions may be performed by the internal drive system 760 and the pivot actuator 752 as programmed actions or events.

According to examples, the external accessory can also include features to dampen shock events, such as when the self-propelled device 720 goes over bumps or experiences collisions. The external accessory can thus include a contact portion to maintain contact with the outer surface of the spherical housing 757, and a housing structure to support any number of functional or non-functional features. Accordingly, the internal drive system 760, the pivot actuator 752, functional or non-functional components of the external accessory (e.g., one or more speakers) can be combined to enable the self-propelled device 720 to exhibit different kinds of actions.

A contact portion of the external accessory can be coupled to the housing structure by one or more shock springs to reduce the effect of impacts on the magnetic coupling. In an aspect of FIG. 7A, as the self-propelled device 720 goes over bumps or experiences collision events, the tilt spring 708 as well as a shock spring of the external accessory can dampen such events to decrease the likelihood of the external accessory decoupling with the self-propelled device 720.

Figure 8:
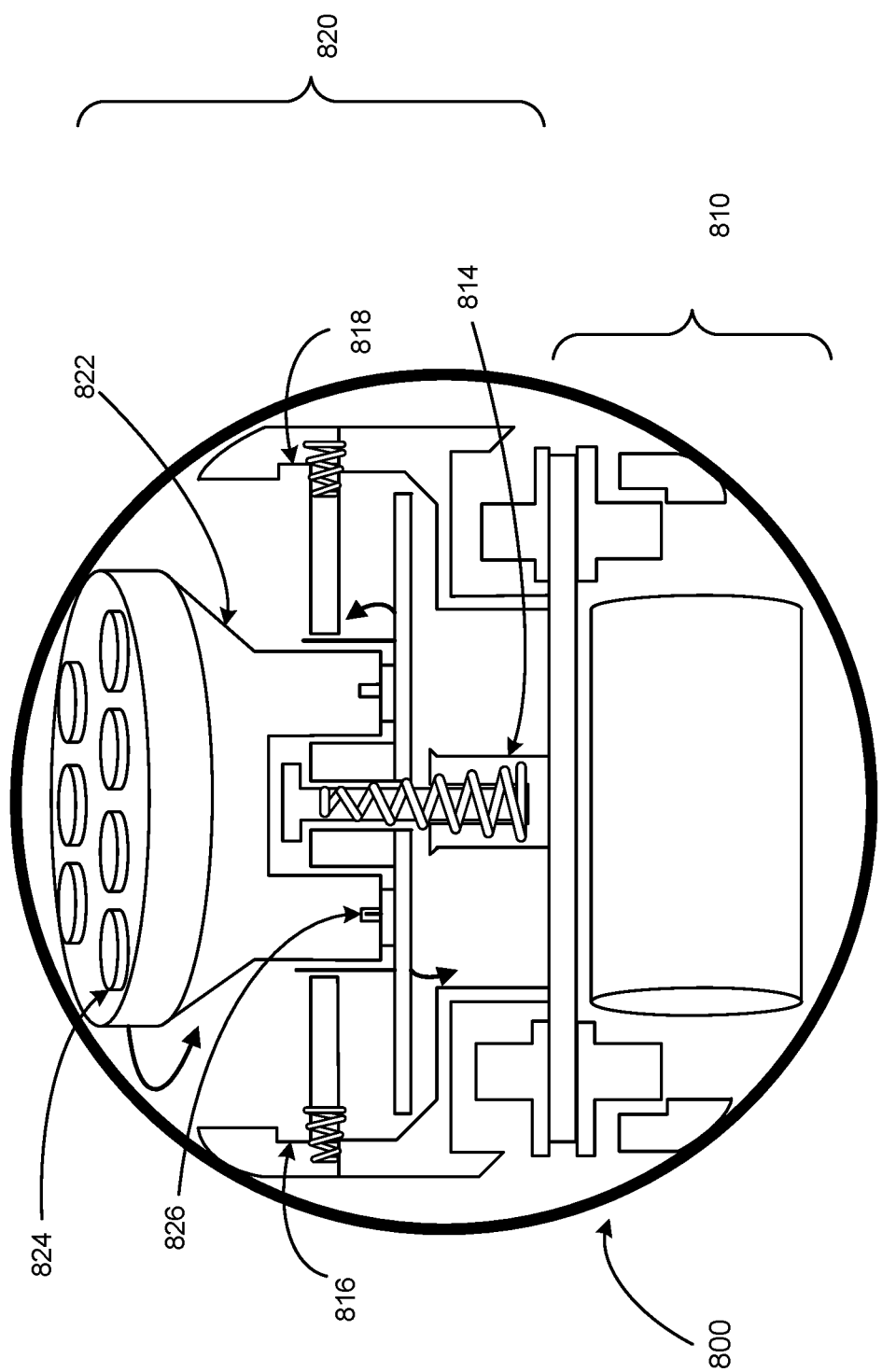
FIG. 8 is a cross-sectional view of an example self-propelled device including a magnetic array.

FIG. 8 is a cross-sectional view of an example self-propelled device including a magnetic array. The self-propelled device 800 and a corresponding external accessory can include various elements discussed above with respect to FIGS. 1, 2A-2C, 3A-3C, 4A-4B, 5A-5B, 6, and 7A-7B. According to many examples described herein, the self-propelled device 800 can include an internal drive system 810 coupled to a biasing assembly 820. The biasing assembly 820 can include a number of biasing elements 816, 818, a pivoting magnet holder 822, and one or more pivot actuators 826 to cause the pivoting magnet holder 822 (and thus the external accessory) to turn. The biasing assembly 820 can be coupled to the internal drive system 810 via a tilt spring 814 that allows the pivoting magnet holder 822 to absorb impacts without decoupling the self-propelled device 800 from the external accessory.

According to some examples, the pivoting magnet holder 822 can hold a magnetic array 824 composed of an array of magnetic elements. Such magnetic elements may be an array of neodymium or other permanent magnets. Alternatively, the magnetic array 824 can be composed of one or more electromagnetics to generate a relatively powerful magnetic field. In some implementations, the external accessory may include a corresponding non-magnetized ferrous metal to magnetically interact with the magnetic array 824 of the self-propelled device 800. Alternatively, the external accessory can include its own complementary set of magnetic elements, or a complementary magnet array, to interact with the magnetic array 824 of the self-propelled device 800. The external accessory can include a housing structure that maintains the complementary set of magnetic elements for coupling to the spherical housing.

Figure 9:
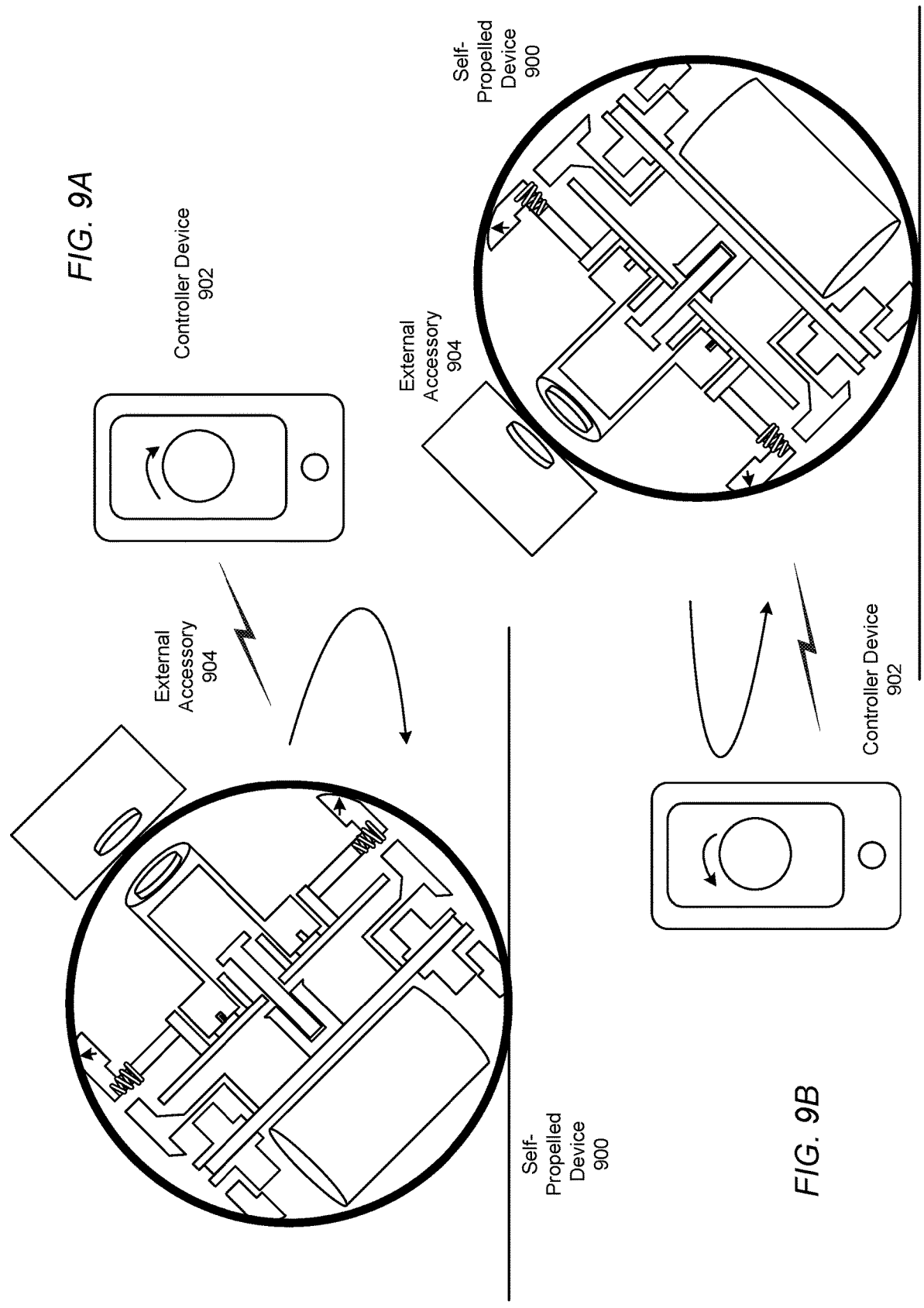
FIGS. 9A-9B illustrate example turn states of the self-propelled device under operative control by a controller device.

FIGS. 9A-9B illustrate example turn states of the self-propelled device under operative control by a controller device. The self-propelled device 900 is depicted from a front view as shown in FIGS. 9A-9B. A user input on the controller device 902 to execute a turn is shown. For example, the user may provide an input to turn the self-propelled device 900 right, as shown in FIG. 9A. The self-propelled device 900 can receive the input, and implement the turn command on the internal drive system, which can cause the internal components to pitch and roll accordingly. As the internal components pitch and roll to execute the turn, the external accessory 904 can also roll correspondingly, maintaining the magnetic interaction with the internal magnets of the self-propelled device 900. FIG. 9B depicts a user input on the controller device to turn the self-propelled device 900 left, where the internal components, along with the external accessory pitch and roll accordingly.

Hardware Diagram

Figure 10:
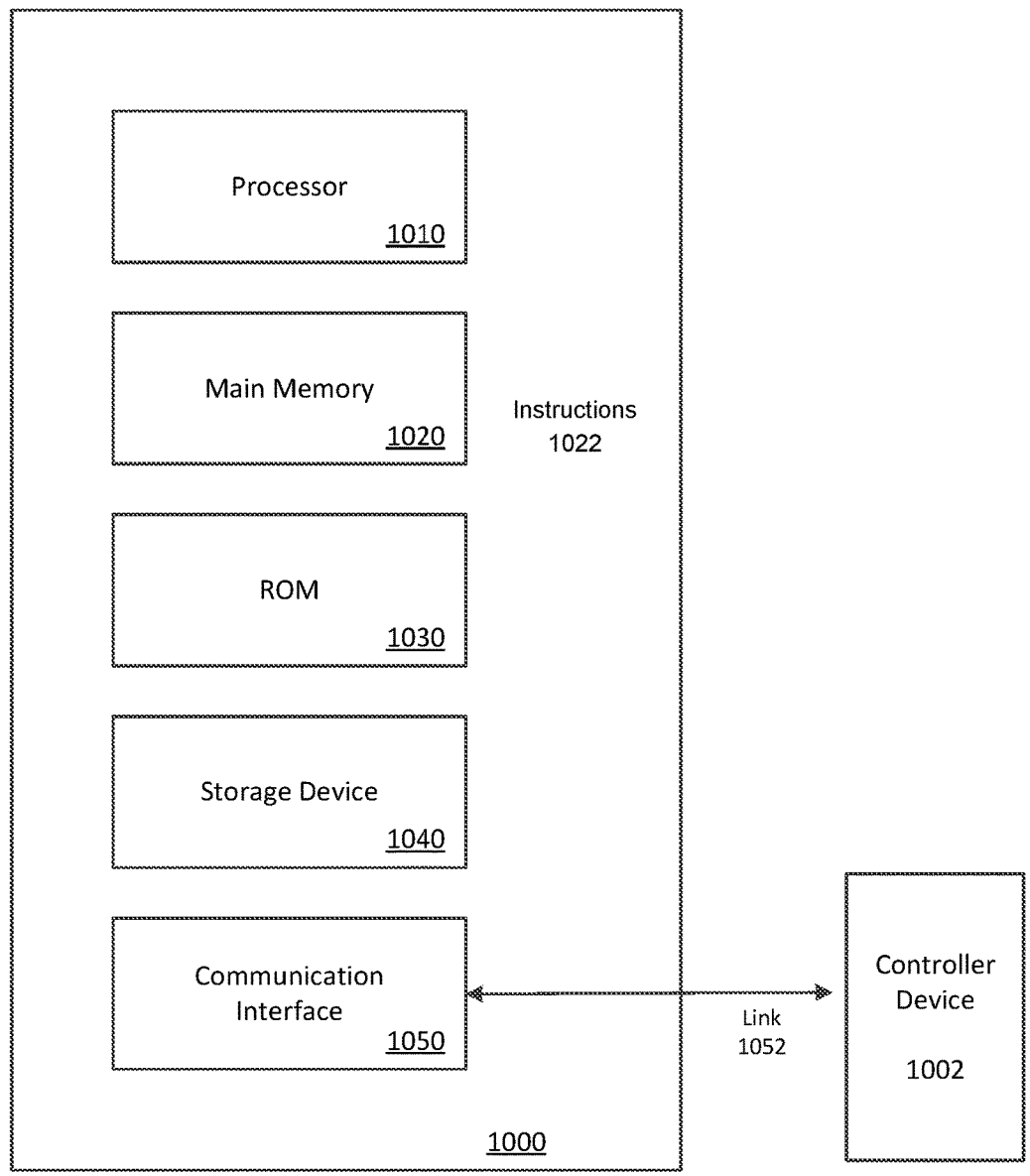
FIG. 10 is an example block diagram that illustrates a computer system upon which examples described may be implemented.

FIG. 10 is an example block diagram that illustrates a computer system upon which examples described may be implemented. For example, one or more components discussed with respect to the system 100 of FIG. 1 may be performed by the system 1000 of FIG. 10. Still further, the computer system 1000 can be implemented on or as part of a self-propelled device, such as shown by examples of FIGS. 2A-2C, FIGS. 3A-3B, FIGS. 4A-4C, FIGS. 5A-5B, FIG. 6, FIGS. 7A-7B, FIG. 8, and FIGS. 9A-9B.

In one implementation, the computer system 1000 includes processing resources 1010, a main memory 1020, ROM 1030, a storage device 1040, and a communication interface 1050. The computer system 1000 includes at least one processor 1010 for processing information and a main memory 1020, such as a random access memory (RAM) or other dynamic storage device, for storing information and instructions 1022 to be executed by the processor 1010. The instructions 1022 can, for example, enable interpretation of input from a controller device 1002 into command input. The main memory 1020 also may be used for storing temporary variables or other intermediate information during execution of instructions to be executed by the processor 1010. The computer system 1000 may also include a read only memory (ROM) 1030 or other static storage device for storing static information and instructions for the processor 1010. A storage device 1040, such as a magnetic disk or optical disk, is provided for storing information and instructions. For example, the storage device 1040 can correspond to a computer-readable medium that triggers logic for maneuvering the self-propelled device discussed with respect to FIGS. 1-2.

The communication interface 1050 can enable computer system 1000 to communicate with a controller device 1002 via an established network link 1052 (wireless or wireline). Using the network link 1052, the computer system 1000 can receive command instructions for maneuvering the self-propelled device.

Examples described herein are related to the use of computer system 1000 for implementing the techniques described herein. According to one example as illustrated in FIG. 10, those techniques are performed by computer system 1000 in response to processor 1010 executing one or more sequences of one or more instructions contained in main memory 1020. Such instructions may be read into main memory 1020 from another machine-readable medium, such as storage device 1040. Execution of the sequences of instructions contained in the main memory 1020 causes processor 1010 to perform the process steps described herein. In alternative implementations, hard-wired circuitry may be used in place of or in combination with software instructions to implement examples described herein. Thus, the examples described are not limited to any specific combination of hardware circuitry and software.

While certain examples have been described above, it will be understood that the examples described are by way of example only. Accordingly, this disclosure should not be limited based on the described examples. Rather, the scope of the disclosure should only be limited in light of the claims that follow when taken in conjunction with the above description and accompanying drawings.

What is claimed is:

1. A self-propelled device comprising:
   a housing;
   an internal drive system enclosed within the housing and operable to accelerate and maneuver the self-propelled device;
   an internal structure coupled to the internal drive system and comprising a magnet holder, the magnet holder including a first set of interactive elements;
   an external accessory comprising a second set of interactive elements to interact, through the housing, with the first set of interactive elements as the self-propelled device accelerates and maneuvers;
   a communication interface to receive control inputs; and
   one or more processors to process the control inputs and implement commands on the internal drive system, based on the control inputs, to accelerate and maneuver the self-propelled device.

2. The self-propelled device of claim 1, wherein the communication interface receives the control inputs via a communication link with a controller device.

3. The self-propelled device of claim 2, wherein the control inputs correspond to voice inputs from a user, the voice inputs being received by the controller.

4. The self-propelled device of claim 2, wherein the controller device comprises one of a smartphone, a tablet computer, or a personal computer that executes a control application specific to operating the self-propelled device.

5. The self-propelled device of claim 1, further comprising:

one or more memory resources storing a set of instructions;

wherein the one or more processors process the control inputs by executing the set of instructions, mapping at least one input of the control inputs to a control movement.

6. The self-propelled device of claim 1, wherein the control inputs comprise one or more of:
voice commands received by the control device;
physical manipulations;
a gesture received on a touchscreen of the control device; or
a tap received on the touchscreen of the control device.

7. The self-propelled device of claim 1, wherein processing the control inputs causes the one or more processors to implement an autonomous mode.

8. The self-propelled device of claim 1, wherein the internal structure includes a biasing mechanism to actively force a pair of wheel of the internal drive system to continuously engage an inner surface of the housing as the self-propelled device accelerates and maneuvers.

9. The self-propelled device of claim 8, wherein the internal drive system includes a pair of independent motors each powering a corresponding one of the pair of wheels.

10. A system comprising:
a controller device; and
a self-propelled device comprising:
  a housing;
  an internal drive system enclosed within the housing and operable to accelerate and maneuver the self-propelled device;
  an internal structure coupled to the internal drive system and comprising a magnet holder, the magnet holder including a first set of interactive elements;
  an external accessory comprising a second set of interactive elements to interact, through the housing, with the first set of interactive elements as the self-propelled device accelerates and maneuvers;
  a communication interface to communicate with the controller device; and
  one or more processors to process control inputs and implement commands on the internal drive system, based on the control inputs, to accelerate and maneuver the self-propelled device.

11. The system of claim 10, wherein the communication interface establishes a link with the controller device to receive the control inputs from the controller device.

12. The system of claim 11, wherein the control inputs correspond to voice inputs, the voice inputs being received by the controller device.

13. The system of claim 11, wherein the controller device comprises one of a smartphone, a tablet computer, or a personal computer that executes a control application specific to operating the self-propelled device.

14. The system of claim 10, wherein the self-propelled device further comprises:
one or more memory resources storing a set of instructions;
wherein the one or more processors process the control inputs by executing the set of instructions mapping at least one input of the control inputs to a control movement.

15. The system of claim 10, wherein the control inputs comprise one or more of:
voice commands received by the control device;
physical manipulations;
a gesture received on a touchscreen of the control device; or
a tap received on the touchscreen of the control device.

16. The system of claim 10, wherein processing the control inputs causes the one or more processors to implement an autonomous mode.

17. The system of claim 10, wherein the external accessory is includes an underlying surface that corresponds to the housing.

18. The system of claim 16, wherein the autonomous mode comprises a mode where control parameters are generated programmatically on the self-propelled device in response to sensor input without need for the control inputs.

19. The self-propelled device of claim 7, wherein the autonomous mode comprises a mode where control parameters are generated programmatically on the self-propelled device in response to sensor input without need for the control inputs.

* * * * *